United States Patent [19]

Iida et al.

[11] Patent Number: 4,711,313
[45] Date of Patent: Dec. 8, 1987

[54] FOLDABLE WEIGHING SCALE

[75] Inventors: Hiroyuki Iida, Fujiidera; Haruhiko Murakami, Hirakata; Tsuyoshi Matsumoto; Junzo Kashihara, both of Nara, all of Japan

[73] Assignee: Sharp Kabushiki Kaisha, Osaka, Japan

[21] Appl. No.: 943,126

[22] Filed: Dec. 18, 1986

[30] Foreign Application Priority Data

| Dec. 19, 1985 | [JP] | Japan | 60-196279[U] |
| Feb. 19, 1986 | [JP] | Japan | 61-36411 |
| Feb. 26, 1986 | [JP] | Japan | 61-42560 |
| Sep. 5, 1986 | [JP] | Japan | 61-210360 |
| Sep. 30, 1986 | [JP] | Japan | 61-233857 |
| Sep. 30, 1986 | [JP] | Japan | 61-233858 |
| Oct. 6, 1986 | [JP] | Japan | 61-238519 |
| Oct. 8, 1986 | [JP] | Japan | 61-239893 |

[51] Int. Cl.⁴ .................. G01G 21/28; G01G 3/14
[52] U.S. Cl. .................. 177/127; 177/25; 177/211
[58] Field of Search .................. 177/126, 127, 25.19, 177/209, 211

[56] References Cited

U.S. PATENT DOCUMENTS

| 3,961,675 | 5/1978 | Siegel | 177/126 |
| 4,043,413 | 8/1977 | Schaenen | 177/126 |
| 4,082,153 | 4/1978 | Provi . | |
| 4,085,810 | 4/1978 | Wellman | 177/209 |
| 4,258,814 | 3/1981 | Dillon | 177/126 |
| 4,328,874 | 5/1982 | Gumberich et al. . | |
| 4,458,770 | 7/1984 | Bucci . | |

FOREIGN PATENT DOCUMENTS

| 166063 | 1/1963 | European Pat. Off. . |
| 1326134 | 6/1961 | United Kingdom . |
| 2033592 | 3/1969 | United Kingdom . |
| 2054874 | 5/1975 | United Kingdom . |

*Primary Examiner*—George H. Miller, Jr.
*Attorney, Agent, or Firm*—Birch, Stewart, Kolasch & Birch

[57] ABSTRACT

A foldable weighing scale of strain gauge type comprising a pair of scale components of generally identical construction and shape. Each of the scale components comprises a platform, a base, and a strain inducing plate having at least one strain gauge. The scale components are hingedly connected together for movement between unfolded and folded positions and are held in an unfolded position when the scale is to be used for the weight measurement.

16 Claims, 57 Drawing Figures

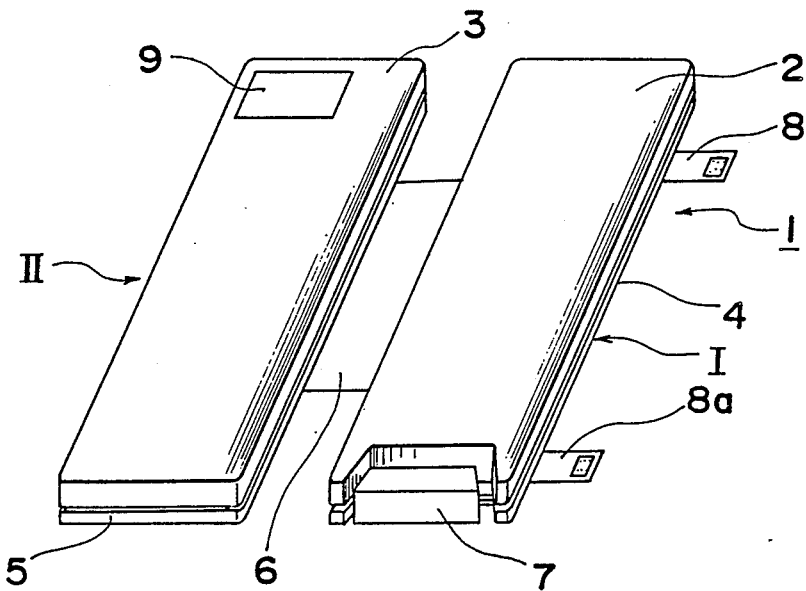
Fig. 1
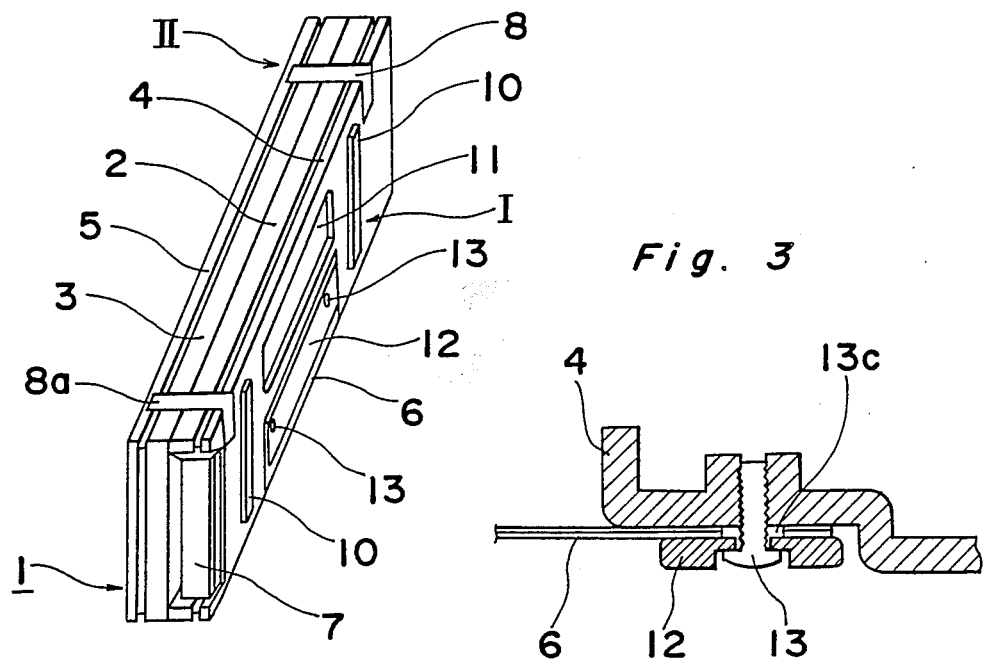
Fig. 2
Fig. 3

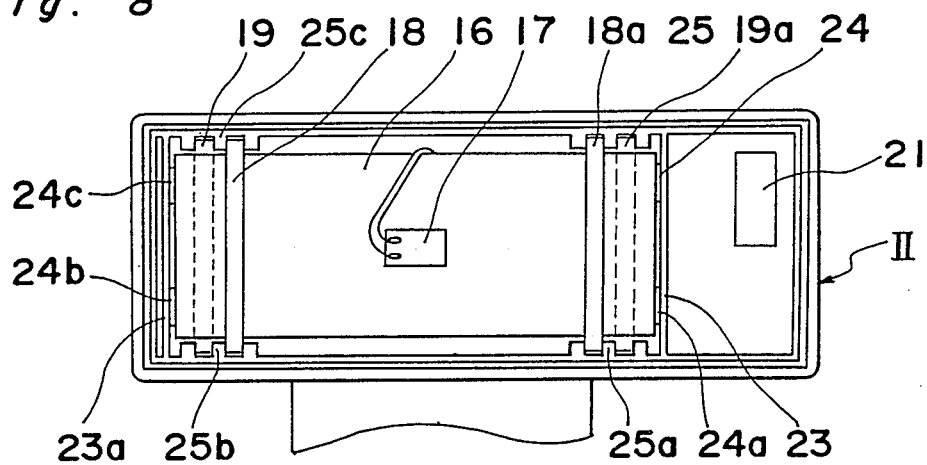
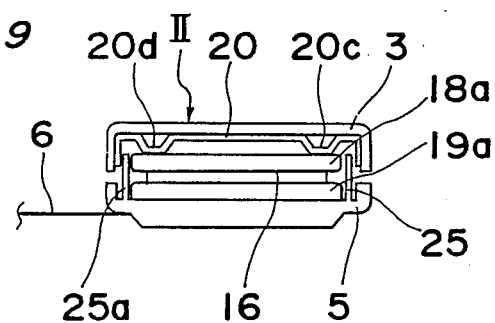
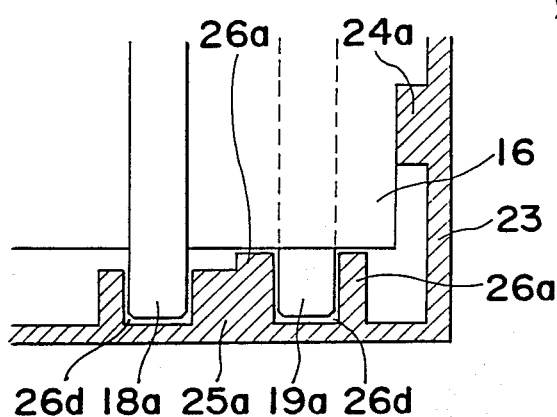
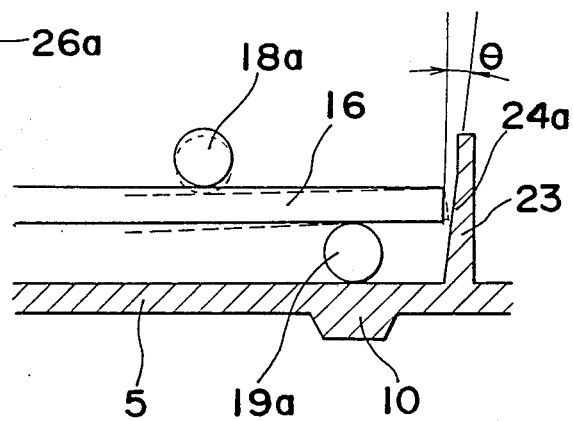
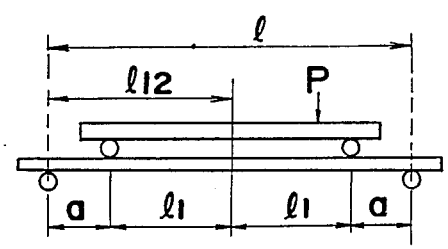

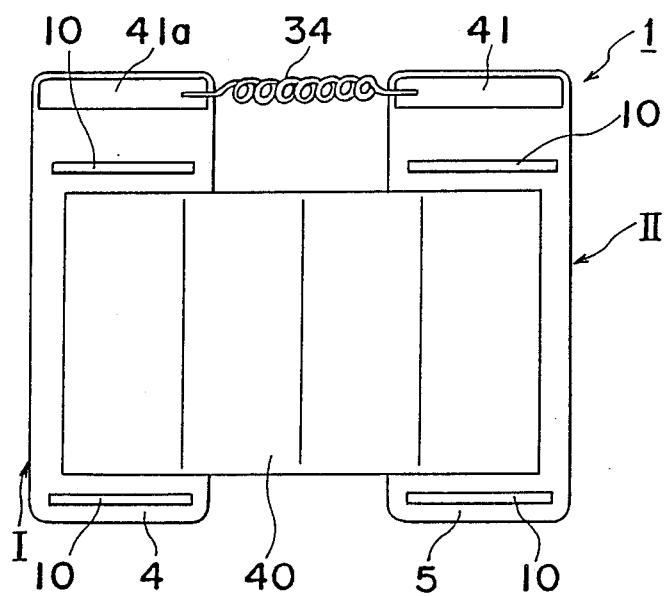
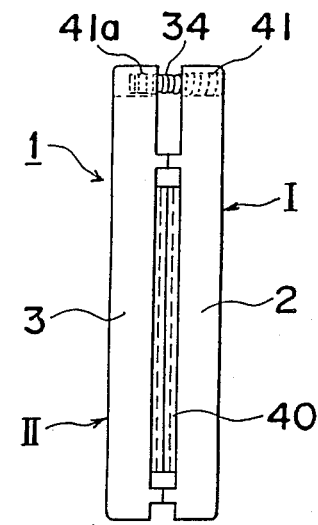
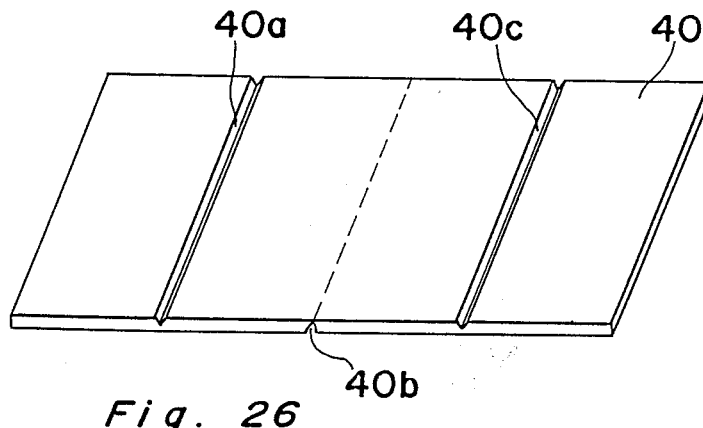
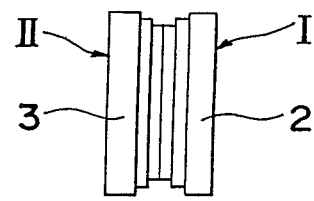
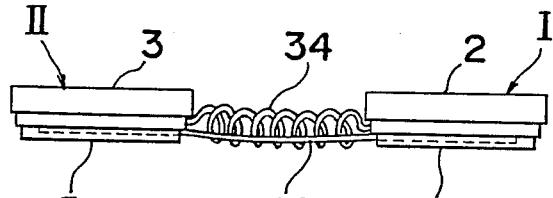
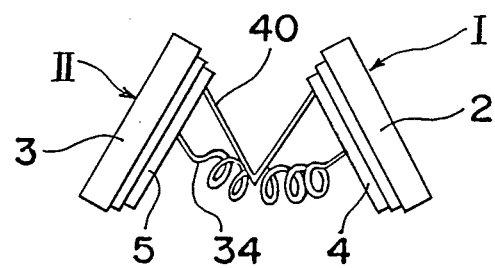

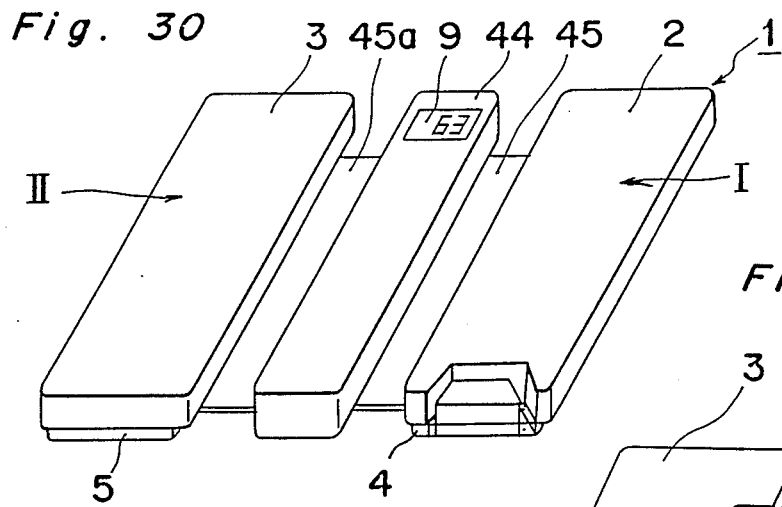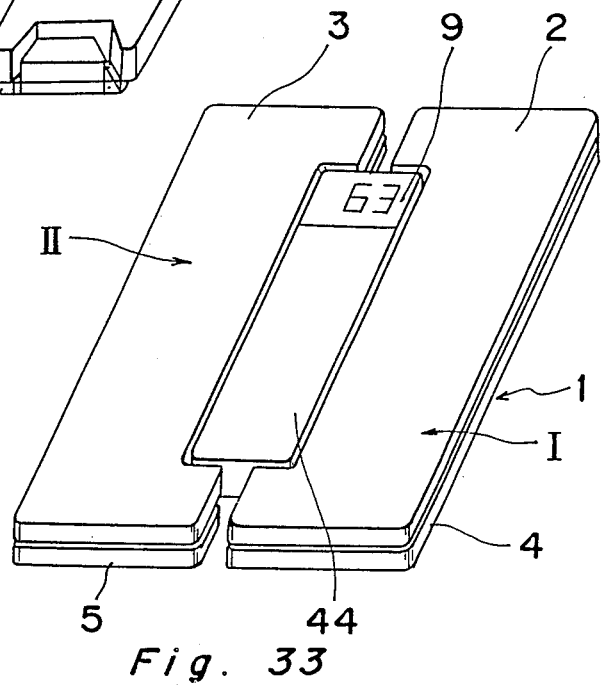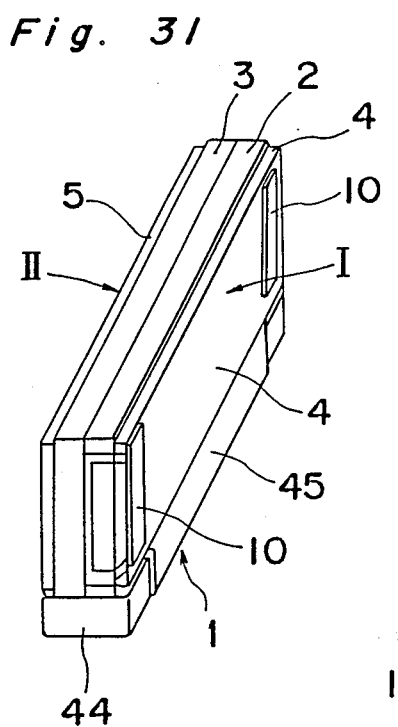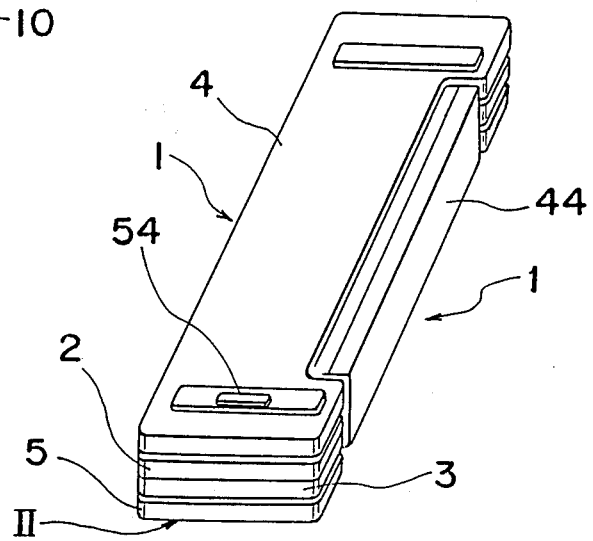

Fig. 50(a)

Fig. 52
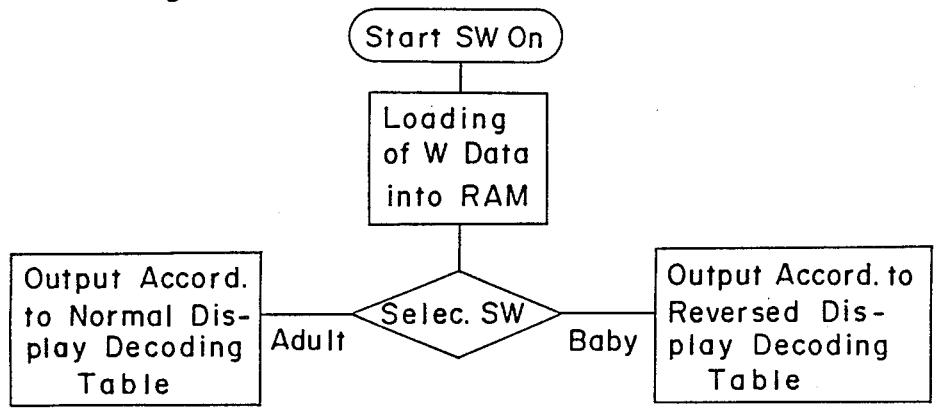
Fig. 53(a)
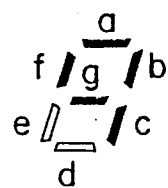
Fig. 53(b)
|   | a | b | c | d | e | f | g |
|---|---|---|---|---|---|---|---|
| 0 | 1 | 1 | 1 | 1 | 1 | 1 | 0 |
| 1 | 0 | 1 | 1 | 0 | 0 | 0 | 0 |
| 2 | 1 | 1 | 0 | 1 | 1 | 0 | 1 |
| 3 | 1 | 1 | 1 | 1 | 0 | 0 | 1 |
| 4 | 0 | 1 | 1 | 0 | 0 | 1 | 1 |
| 5 | 1 | 0 | 1 | 1 | 0 | 1 | 1 |
| 6 | 1 | 0 | 1 | 1 | 1 | 1 | 1 |
| 7 | 1 | 1 | 1 | 0 | 0 | 1 | 0 |
| 8 | 1 | 1 | 1 | 1 | 1 | 1 | 1 |
| 9 | 1 | 1 | 1 | 0 | 0 | 1 | 1 |
Fig. 54(a)
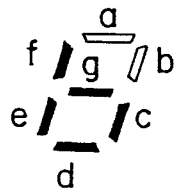
Fig. 54(b)
|   | a | b | c | d | e | f | g |
|---|---|---|---|---|---|---|---|
| 0 | 1 | 1 | 1 | 1 | 1 | 1 | 0 |
| 1 | 0 | 0 | 0 | 0 | 1 | 1 | 0 |
| 2 | 1 | 1 | 0 | 1 | 1 | 0 | 1 |
| 3 | 1 | 0 | 0 | 1 | 1 | 1 | 1 |
| 4 | 0 | 0 | 1 | 0 | 1 | 1 | 1 |
| 5 | 1 | 0 | 1 | 1 | 0 | 1 | 1 |
| 6 | 1 | 1 | 1 | 1 | 0 | 1 | 1 |
| 7 | 0 | 0 | 1 | 1 | 1 | 1 | 0 |
| 8 | 1 | 1 | 1 | 1 | 1 | 1 | 1 |
| 9 | 0 | 0 | 1 | 1 | 1 | 1 | 1 |

FOLDABLE WEIGHING SCALE

BACKGROUND OF THE INVENTION

1. Field of Technology

The present invention generally relates to a digital weighing scale, for example, of a type utilizing a strain gauge and, more particularly, to a foldable version thereof.

2. Description of the Prior Art

A strain gauge type weighing scale having a reduced overall thickness as compared with a mechanical weighing scale is well known and disclosed in, for example, Japanese Laid-open Patent Publication No. 60-42620 published in 1980. Regardless of whether they are of a strain gauge type or whether they are of a mechanical type, most conventional weighing scales are required to have a platform of a size sufficient to steadily support the user of the scale who stands thereon. This is because, if the user standing on the scale platform fails to maintain his or her stability, no correct and exact measurement of his or her weight can be achieved. The size of the scale platform is generally selected to be relatively large in consideration of the presumably average foot stance of adult people and the maximum available foot size.

In view of the foregoing, the use of the relatively large platform necessarily makes use of a correspondingly large base on which is relatively displaceably mounted, and therefore, the weighing scale as a whole is so bulky as to provide an obstruction to the portability.

SUMMARY OF THE INVENTION

Accordingly, the present invention has been developed with a view to substantially eliminating the above discussed problem and has for its essential object to provide a foldable weighing scale of a type foldable into a compact size convenient to carry and having an improved measuring capability.

In order to accomplish the above described object of the present invention, an improved weighing scale is of a strain gauge type and comprises two foldable components generally identical in construction and shape which are hingedly connected together for movement between folded and unfolded positions.

Each of these components is of a generally rectangular shape and comprises a base, a platform disposed above the base for relative movement close towards and away from the base, a strain including plate accommodated in a space, delimited by the base and the platform, and supported at its opposite ends for deformation in a direction perpendicular to the strain inducing plate when a load is exteriorly applied thereto through the platform, and at least one strain gauge mounted on the strain inducing plate at a location intermediate, or substantially intermediate, of the length of the strain inducing plate.

The weighing scale also comprises a display unit electrically connected with the strain gauges in these components for converting respective output signals from these strain gauges into a weight signal and for displaying information represented by the weight signal, an electrically connecting means for connecting between the strain gauges, and a hingedly connecting means for connecting the components together.

According to the present invention, and when a person desires to weigh himself or herself, he or she may stand on the weighing scale with his or her feet placed on the respective platforms of these components. Therefore, the platform of each component is of a size corresponding to the surface area of the sole of a person's foot. However, there is not the only way of use of the weighing scale according to the present invention. In any event, the two-component weighing scale according to the present invention is very convenient to carry and transport and does not require a relatively large space for storage as long as the components are folded together.

Preferably, the two-component weighing scale according to the present invention may have a handle means for access to the hand of the user.

Also, the hingedly connecting means may be of a releasable type by which the components when unfolded can be separated any desired distance from each other without disconnecting the electrically connecting means, said distance being within the range over which the electrically connecting means is permitted to extend.

BRIEF DESCRIPTION OF THE DRAWINGS

This and other objects and features of the present invention will become readily understood from the following description taken in conjunction with preferred embodiments thereof with reference to the accompanying drawings, in which:

FIG. 1 is a perspective view of a weighing scale according to a first embodiment of the present invention, shown unfolded;

FIG. 2 is a perspective view of the weighing scale of FIG. 1 shown as folded;

FIG. 3 is a partial sectional view of one of the two components of the weighing scale of FIG. 1, showing a connection of a flexible connecting band to such one of the components;

FIG. 8 is a schematic top sectional view of FIG. 7;

FIG. 9 is a schematic end sectional view of FIG. 7;

FIG. 10 is a top sectional view, on an enlarged scale, of one corner portion of one of the components showing how a strain inducing plate is supported;

FIG. 11 is a side sectional view of FIG. 10;

FIG. 12 is a schematic diagram showing the principle of a strain gauge measuring system used in the present invention;

FIG. 24 is a bottom plan view of FIG. 23;

FIG. 25 is a perspective view of a hingedly connecting member used in the weighing scale of FIG. 23;

FIGS. 26 to 28 are schematic diagrams showing the sequence of folding of the connecting member as the weighing scale of FIG. 23 in the unfolded position is folded;

FIG. 29 is an end view of the weighing scale of FIG. 23 in the folded position;

FIGS. 30 and 31 are views similar to FIGS. 1 and 2, respectively, showing a fifth embodiment of the present invention;

FIGS. 32 and 33 are views similar to FIGS. 1 and 2, respectively, showing a sixth embodiment of the present invention;

FIGS. 50(a) and 50(b) are schematic perspective views of the weighing scale according to a tenth embodiment of the present invention, showing the weighing scale being used in different manners, respectively;

FIG. 52 is a schematic flowchart showing the sequence of operation of a microcomputer used in an eleventh embodiment of the present invention; and FIGS. 53(a) and (b) and 54(a) and (b) illustrate a respective relationship between segments of one digit display element and a display decoder.

DETAILED DESCRIPTION OF THE INVENTION

Figure 4:
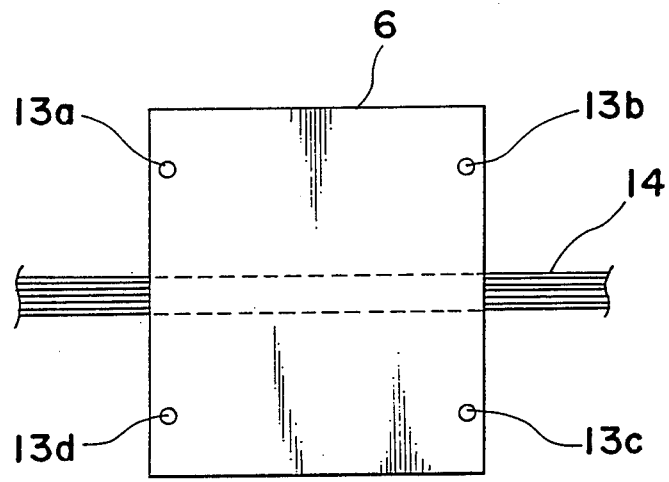
FIG. 4 is a top plan view of the flexible connecting band.

Referring first to FIGS. 1 to 15 showing the first embodiment of the present invention, a strain gauge type weighing scale generally identified by 1 comprises right-hand and left-hand scale components I and II which are generally identical in construction and shape and which are connected together by means of a flexible connecting band 6. Each of the scale components I and II comprises a generally rectangular base 4 or 5 and a similarly rectangular platform 2 or 3 disposed above the associated base 4 or 5 for relative movement both towards and away from such base 4 or 5, the movement of the platform 2 or 3 relative to the associated base 4 or 5 taking place when a load is exteriorly imposed on such platform 2 or 3.

The right-hand scale component I is provided with a start switch 7 operatively carried by the base 4 at one end thereof and also with a pair of fastening straps 8 and 8a rigidly connected to the base 4 so as to extend outwards from one side of the base 4 remote from the connecting band 6. These fastening straps 8 and 8a are in the form of hook tapes releaseably engageable with respective loop tapes (not shown), secured to the base 5 of the left-hand scale component II, for retaining the scale components I and II in a folded position as best shown in FIG. 2. A combination of the hook and loop tapes is commercially known as a "Velcro fastener". On the other hand, one of the right-hand and left-hand scale components, for example, the left-hand scale component II, is provided with a display unit 9 exposed to the outside through the platform 3 for the display of the weight measured.

As best shown in FIG. 2, the base 4 and 5 are provided with respective pairs of spacer legs 10 secured to the outer surfaces thereof and spaced from each other in a direction longitudinally of any one of the scale components I and II. These bases 4 and 5 are formed with rectangular openings 11 each extending longitudinally of the associated scale component I or II along one side edge thereof remote from the connecting band 6, which openings 11 provide an access to the hand of the user when the components I and II are in the folded position, so that the user can conveniently carry the weighing scale 1 by hand.

Figure 5:
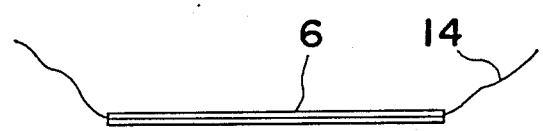
FIG. 5 is a side view of FIG. 4.

The connecting band 6 has each of its opposite ends connected to the associated base 4 or 6 by means of a respective fixture plate 12 secured thereto through a plurality of fastening members 13, for example, screw members as shown in FIG. 3. As best shown in FIG. 4, for permitting the fastening members 13 to pass through the associated end of the connecting band 6 then sandwiched between the base 4 and the respective fixture plate 12, that end of the connecting band 6 is formed with holes 13a and 13d, or 13b and 13c. The connecting band 6 serves not only to connect the right-hand and left-hand scale components I and II together hingedly, but also to transmit a measurement signal, indicative of the weight measured in one of the scale components I and II, to an arithmetic unit provided in the other of the scale components I and II. For this purpose, as best shown in FIGS. 4 and 5, the connecting band 6 made of a soft material such as, for example, polyester, is of a three-layered structure in which a flexible, printed wiring substrate is embedded, and therefore, not only can electric signals be transmitted between the scale components I and II, but also the connecting band 6 can bend freely to enable the scale components I and II to be selectively folded and unfolded as shown respectively in FIG. 2 and FIG. 1.

Figure 6:
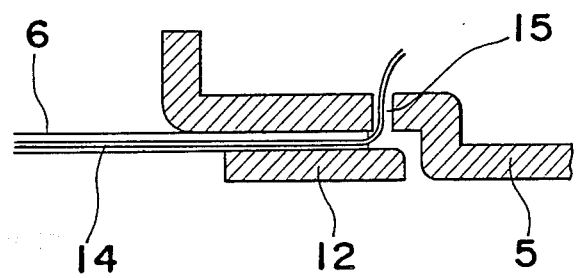
FIG. 6 is a view similar to FIG. 3 showing the manner in which electric wirings embedded in the connecting band extend into such one of the components.

FIG. 6 illustrates how each end portion of the flexible printed wiring substrate 14 which protrudes outwardly from the connecting band 6 is inserted into the interior of the adjacent scale component I or II. As shown therein in connection with the base 5 of the left-hand scale component II, each of the bases 4 and 5 is formed with a slot 15 through which the adjacent end portion of the printed wiring substrate 14 extends into the interior of the associated scale component I or II for connection with the arithmetic unit (not shown).

Hereinafter, the details of each of the scale components I and II will be described with particular reference to FIGS. 7 to 11. It is, however, to be noted that, since the scale components I and II are generally identical in construction, reference will be made only to one of them, for example, the left-hand scale component II.

Figure 7:
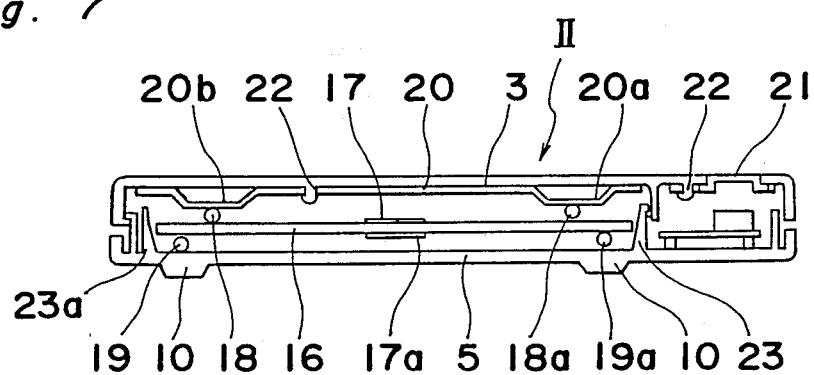
FIG. 7 is a schematic longitudinal sectional view of one of the components of the weighing scale of FIG. 1.

The scale component II has a generally rectangular strain inducing plate 16 mounted on the base 5 in a manner as will be described later. The strain inducing plate 16 has a pair of strain gauges 17 and 17a secured to the opposite surfaces thereof and located intermediate of the length of the strain inducing plate 16. A pair of round rods 19 and 19a are rigidly mounted on the base 5 so as to extend parallel to each other in a direction widthwise of the scale component II and spaced a distance from each other. The strain inducing plate 16 is placed above the base 5 with its opposite end portions resting on the respective round rods 19 and 19a and is positioned between the round rods 19 and 19a and a pair of round rods 18 and 18a, said round rods 18 and 18a being spaced a distance smaller than the distance between the round rods 19 and 19a and located inwardly of the round rods 19 and 19a as best shown in FIGS. 7 and 8. The round rods 18 and 18a are rigidly secured to the undersurface of a reinforcement plate 20 which is in turn secured to the undersurface of the platform 3.

The reinforcement plate 20 concurrently serves to reinforce the platform 3 and to transmit a load, placed to the platform 3, to the strain inducing plate 16 through the spaced round rods 18 and 18a. For this purpose, the reinforcement plate 20 is formed by the use of any known press work with recesses 20a, 20b, 20c and 20d so as to extend along the four side edges thereof, thereby to increase the rigidity of the reinforcement plate 20 which is required for the reinforcement plate 20 not only to withstand against the maximum possible load which would be imposed on the platform 3, but also to distribute the load uniformty to the round rods 18 and 18a for avoiding any possible bias of weight.

The display unit 9 provided only in the left-hand scale component 3 comprises a display panel 21 through which the weight measured can be displayed for viewing by the user, said display panel 21 being secured together with the reinforcement plate 20 to the platform 3 by means of fastening means 22, for example, set bolts or screws, or by the use of any known spot-welding technique.

Reference numerals 23 and 23a represent angle members operable to position the strain inducing plate 16 above the base 5 and being so shaped as shown in FIGS. 10 and 11. As best shown in FIGS. 10 and 11, these angle members 23 and 23a are formed with respective pairs of inclined projections 24, 24a and 24b, 24c (FIG. 8) each having an inclined surface to which an associated end of the strain inducing plate 16 is engageable. The pairs of the inclined projections 24, 24a and 24b, 24c and the strain inducing plate 16 are so positioned and so dimensioned that, so long as no external load is imposed on the scale component, the strain inducing plate 16 can contact only one of the pairs of the inclined projections 24, 24a and 24b, 24c formed respectively in the angle members 23 and 23a. Accordingly, when the strain inducing plate 16 bends as shown by the phantom line in FIG. 11 with its opposite end portions shifted upwards as a result of the external load imposed on the scale component II, the strain inducing plate being so bent will not contact the pair of inclined projections 24 and 24a because the contact surface of each of the inclined projections 24 and 24a facing the strain inducing plate 16 is inclined at a predetermined angle shown by $\theta$ in FIG. 11. With respect to the other pair of inclined projections 24b and 24c which the strain inducing plate 16 contacts, although the associated end of the strain inducing plate 16 contacting the inclined projections 24b and 24c shifts upwards when the strain inducing plate 16 is deformed as a result of the application of the external load, the angle $\theta$ is selected to be large enough to accommodate the dimensions to which the strain inducing plate 16 may bend and, therefore, the contact between the pair of inclined projections 24b and 24c will no longer occur subsequent to the application of the external load, thereby eliminating any possible friction resulting from the contact with the end of the strain inducing plate 16.

As shown in FIGS. 8 and 10, the round rods 18 and 18a and the round rods 19 and 19a have their opposite ends received in respective sockets 26d each defined between rod retaining angle members 25, 25a, 25b, 25c formed integrally with the upper surface of the base 5. Any possible displacement of the strain inducing plate 16 in a direction widthwise thereof is prevented by steps 26, 26a and 26b, 26c formed in the angle members 25, 25a and 25b, 25c and located adjacent the round rods 19 and 19a which would not bend so much as the round rods 18 and 18a upon application of the external load, the friction being minimized in view of the fact that these contact regions are located adjacent the lower support points where the deformation is minimum. Accordingly, the angle members 23 and 23a for retaining the strain inducing plate 16 and the angle members 25, 25a, 25b and 25c for retaining the round rods 18, 18a and 19, 19a altogether provide a substantially frictionless mechanism for keeping the strain inducing plate 16 in position above the base 5.

Figure 13:
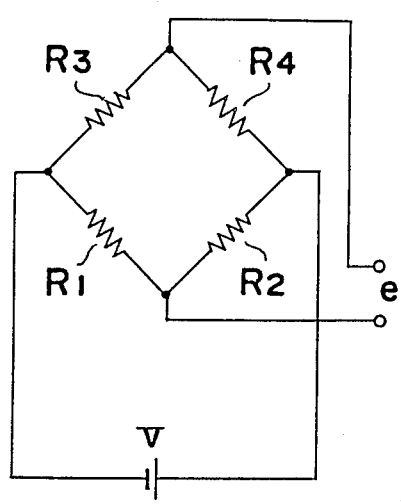
FIG. 13 is a diagram showing a bridge network used in the weighing scale embodying the present invention.

The principle of weight measurement will now be described with particular reference to FIGS. 12 to 14.

FIG. 12 illustrates the relationship between the strain gauges 17 and 17a in each scale component I and II and the upper and lower support points provided by the round rods 18, 18a and 19, 19a for the support of the strain inducing plate 16 in such scale component I or II. The gauges 17 and 17a are located at a position spaced a distance l/2 from any one of the upper support points and a distance l1 from any one of the lower support points. In other words, the position of the strain gauges 17 and 17a is spaced an equal distance from any one of the upper support points and also from any one of the lower support points. Accordingly, when a person desiring to weigh himself stands on the scale with his feet placed on the platforms 2 and 3 of the respective scale components I and II, the weight is divided in part by the upper support rods 18 and 18a in one of the scale components I and II into weight components P1 and P2 and in part by the upper support rods 18 and 18a in the other of the scale components I and II into weight components P3 and P4. These weight components P1 and P2 are transmitted to the strain inducing plate 16 in, for example, the left-hand scale component II whereas the weight components P3 and P4 are transmitted to the strain inducing plate 16 in the right-hand scale component I.

The weight P of the person is expressed as follows.

$$P = (P1+P2)+(P3+P4) \tag{1}$$

Assuming that each of the strain inducing plates 16 in the scale components I and II has a width b, a height h and a modulus E of longitudinal elasticity, the strain $\epsilon_1$ induced at a central portion of the strain inducing plate 16 in the left-hand scale component II and the strain $\epsilon_2$ induced at a central portion of the strain inducing plate 16 in the right-hand scale component I can be expressed as follows.

$$\epsilon_1 = (3a/Ebh^2)(P1+P2) \tag{2}$$

$$\epsilon_2 = (3a/Ebh^2)(P3+P4) \tag{3}$$

In each of the scale components I and II, the strain measured by the strain gauge 17 on the upper surface of the strain inducing plate 16 takes a negative sign whereas that by the strain gauge 17a on the lower surface of the same plate 16 takes positive sign. If all of the strain gauges 17 and 17a in both of the scale components I and II are electrically connected in a bridge network as shown in FIG. 13 wherein the strain gauges 17 and 17a in the left-hand scale component II are represented by respective resistors R1 and R2 and those in the right-hand scale component I are represented by respective resistors R3 and R4, and assuming that the voltage supplied to the bridge network is V, the bridge network can produce and output voltage of a value e espressed as follows.

$$e = \left( \frac{R1}{R1+R2} - \frac{R3}{R3+R4} \right) \cdot V \tag{4}$$

Since in general the resistance R of the strain gauge can be $R = Rv(1+\epsilon K)$ wherein Rv represents the initial resistance, K represents a gauge factor and $\epsilon$ represents the strain, the respective values of the resistors R1 to R4 are as follows.

$$R1 = Rv(1+\epsilon 1K) \tag{5}$$

$$R2 = Rv(1-\epsilon 1K) \tag{6}$$

$$R3 = Rv(1-\epsilon 2K) \tag{7}$$

$$R4 = Rv(1+\epsilon 2K) \tag{8}$$

Using equations (5) to (8), equation (4) can be modified as follows.

$$e = (\epsilon 1 + \epsilon 2/2) \cdot KV \tag{9}$$

Introducing equations (2) and (3) into equation (9) results in:

$$e = (3aKv/2Ebh^2)(P1+P2+P3+P4) \tag{10}$$

Further introducing equation (1) into equation (10) results in:

$$e = (3aKv/2Ebh^2) \cdot P \tag{11}$$

Thus, the output voltage 3 from the bridge network depends on the weight P and is not affected by the manner in which the weight components, that is, loads P1, P2, P3 and P4 are distributed, and therefore, the output voltage e is proportional to the weight P.

Figure 14:
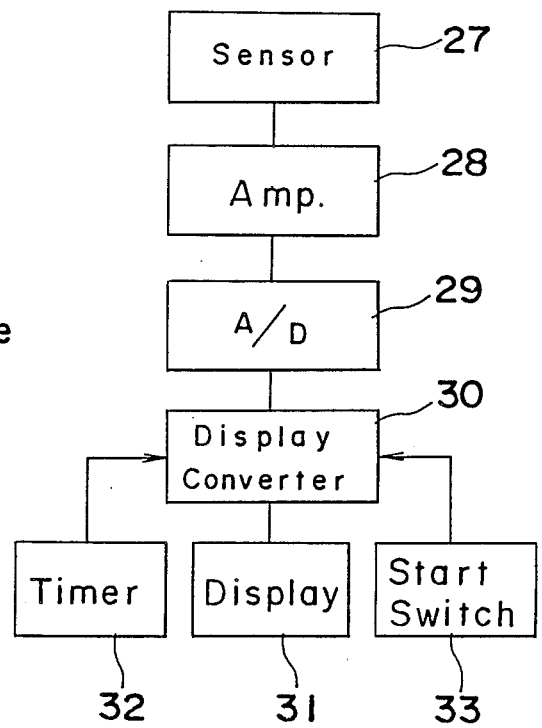
FIG. 14 is a circuit block diagram of the weighing scale.

An electric circuit used in the weighing scale is schematically shown in FIG. 14. In FIG. 14, reference numeral 27 represents a sensor comprised of the strain gauges, reference numeral 28 represents an amplifier, reference numeral 29 represents an analog-to-digital converter, and reference numeral 30 represents a display converter. The display converter 30 is connected with a display 31 and also with both a timer 32 and a start switch unit 33.

Figure 15:
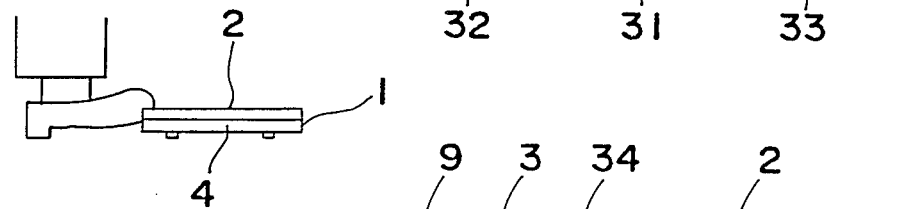
FIG. 15 is a diagram showing the manner in which the weighing scale is used.

The system shown in and described with reference to FIGS. 1 to 14 operates in the following manner. Assuming that the scale components I and II are unfolded and placed on a support surface, for example, the floor, and the start switch 7 provided in the right-hand scale component I is turned on in a manner as shown in FIG. 15, the start switch unit 33 activates all of the circuit components, bringing them in an electrically conductive state. At this time, the display converter 30 causes the display 31 to provide, for a predetermined length of time, for example, 3 seconds subsequent to the conduction, an indication inhibiting the person from standing on the weighing scale. This indication may be done by, for example, causing display elements to blink or to present a sign reading "E.E.E". This is because, subsequent to the powering of the electric circuitry used in the weighing scale, the electric circuitry is in an unstable state as a result of the self-heating and because no accurate weight measurement can therefore be achieved even if the person stands on the weighing scale immediately after the powering of the electric circuitry. Thus, the predetermined length of time referred to above is provided for the electric circuitry to gain its stability. After the passage of 3 seconds subsequent to the powering, the indication on the display 31 disappears and the weighing scale is now ready for the actual use, i.e., the actual weight measurment.

When the person desiring to measure his weight stands on the weighing scale with his feet placed on the platforms 2 and 3, the output from the bridge network is converted by the sensor 27 into a voltage which is in turn amplified by the amplifier 28. The amplifier voltage is subsequently converted by the converter 29 into a digital signal which is then converted by the display converter 30 into one or more numerical data which are displayed by the display 31. The numerical data representative of the weight once displayed by the display 31 remains displayed for a predetermined length of time, for example, several seconds, determined by the setting of the timer 32. The supply of an electric power to the electric circuitry can be automatically turned off after the passage of the predetermined time determined by the setting of the timer 32. This is advantageous in that the person standing on the weighing scale need not watch the display while standing on the weighing scale, but may view the display after he has left the platforms 2 and 3. This permits the person to keep his stance stable on the platforms 2 and 3 without being worried about the display and, therefore, the scale will not be unnecessarily disturbed by the movement of the person on the weighing scale.

It is to be noted that, if semiconductor strain gauges are employed in place of metal strain gauges, change in resistance would be about ten times that afforded by the metal strain gauge and, therefore, the use of the amplifier may be dispensed with, making it possible to manufacture the weighing scale in a compact size. This can also be accomplished if an analog-to-digital converting LSI capable of converting directly into numerical data is used.

Figure 16:
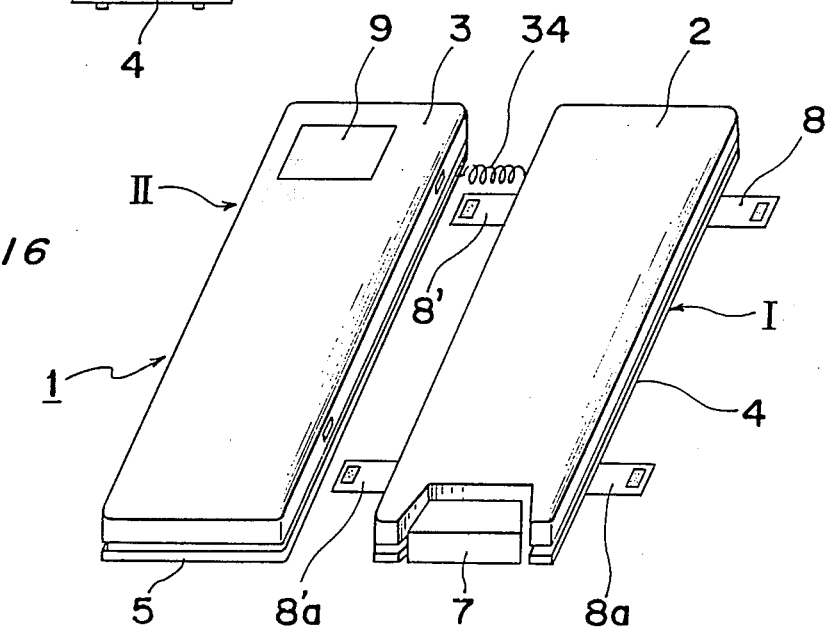
FIG. 16 is a perspective view of the weighing scale according to a second embodiment of the present invention, shown as unfolded.

In the embodiment shown in FIG. 16, the right-hand and left-hand scale components I and II are rendered to be separable from each other. For this purpose, instead of the use of the flexible connecting band having the printed wiring substrate embedded therein such as in the foregoing embodiments, similar Velcro fasteners 8' and 8'a are used as means for hingedly connecting the scale components I and II together, in combination with a spirally curled flexible cord 34 for electrically connecting the circuit components in these scale components I and II together. Each of the fasteners 8' and 8'a includes a loop tape secured to the base 4 of the right-hand scale component I and a loop tape secured to the base 5 of the left-hand scale component II and releaseably connectable with the hook tape.

Figure 17:
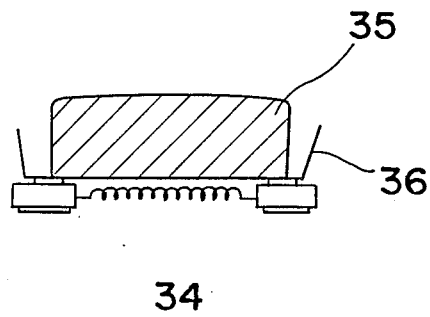
FIGS. 17 and 18 illustrate different manners in which the weighing scale of FIG. 16 is used.
Figure 18:
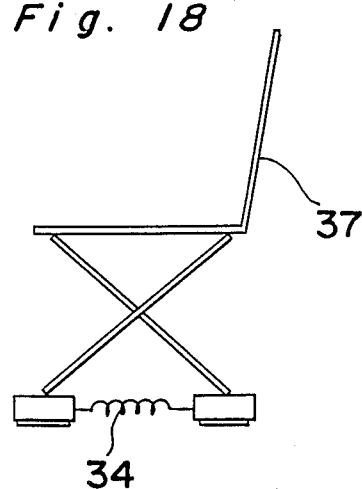
Figure 19:
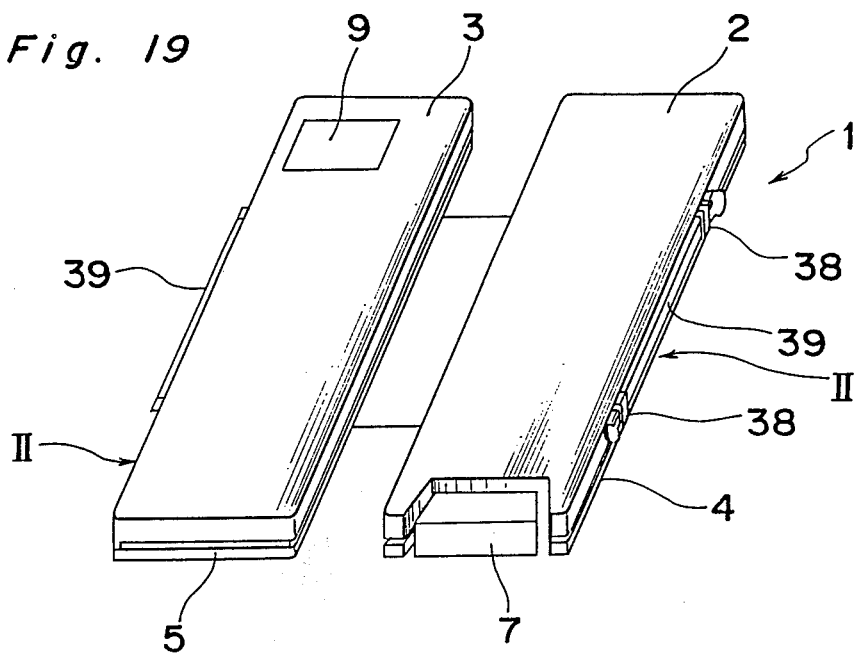
FIG. 19 is a view similar to FIG. 1, showing a third embodiment of the present invention.

As long as the weighing scale according to the embodiment shown in FIG. 16 is used for the measurement of the weight of a person, the right-hand and left-hand scale components I and II may not be separated from each other, i.e., the fasteners 8' and 8'a may not be disconnected. However, the separation of the scale components I and II is often required or considered convenient where a relatively large object of a size which one of the platforms 2 and 3 can not accommodate is desired to be measured with the use of, for example, a basket 36 such as shown in FIG. 17 or where a person wishes to measure his weight while sitting on a chain 37 such as shown in FIG. 18. It is pointed out that the use of the chair is effective to permit the person to be more stable than standing on the weighing scale, and therefore, an accurate weight measurement is possible without the scale being disturbed by the movement of the person.

It is to be noted that, if the basket 36 or the chair 37 is placed on the weighing scale prior to the start switch 7 being activated or turned on, the weight of the basket 36 or the chair 37 is in no way added to the measurement, and therefore, the net weight of the object in the basket 36 or the person sitting on the chair 37 can be accurately measured. In other words, the display will read "0 kg" immediately after the actuation of the start switch, provided that the basket 36 or the chair 37 is placed on the weighing scale prior to the activation of the start switch.

In the embodiment shown in FIGS. 19 to 22, instead of the openings 11 formed in the base 4 and 5 for the access to the hand of the user such as in the embodiment of FIGS. 1 to 15, a pair of flexible handle pieces 39, one for each scale component I and II, are employed for providing a handle for the access to the hand of the user. Each of the handle pieces 39 is fitted to one side wall of the base 4 or 5 of the associated scale component I or II by means of a pair of generally U-shaped fixtures 38.

Figure 20:
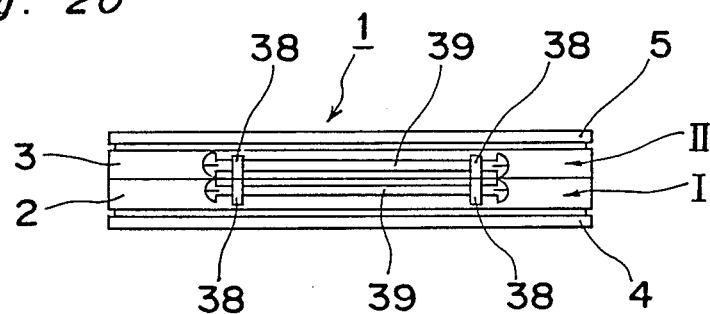
FIG. 20 is a top plan view of the weighing scale of FIG. 19 in the folded condition.
Figure 21:
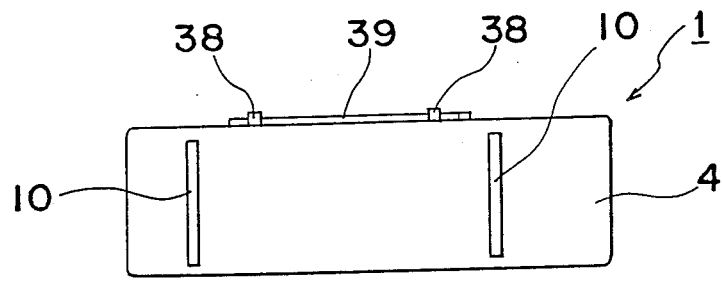
FIGS. 21 and 22 are side views of the weighing scale of FIG. 20 showing a handle folded and pulled, respectively.
Figure 22:
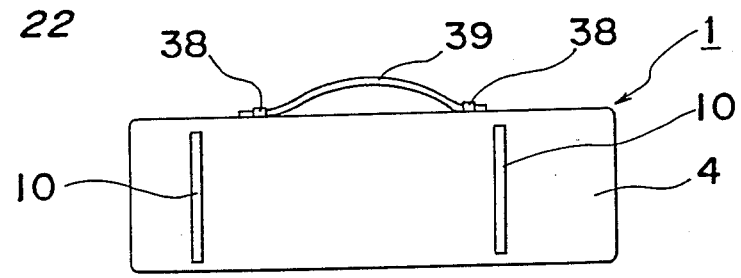
Figure 23:
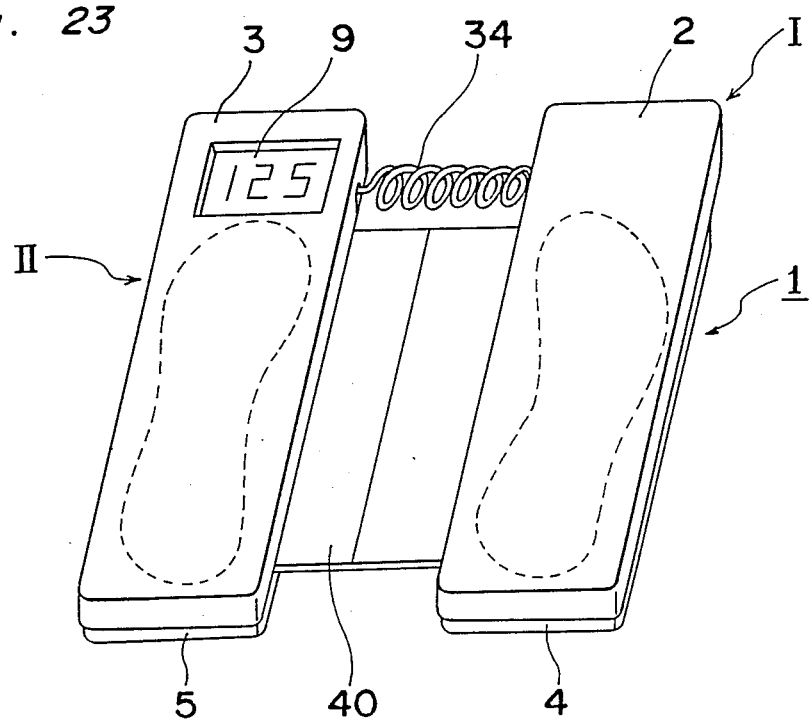
FIG. 23 is a perspective view of the weighing scale according to a fourth embodiment of the present invention shown as unfolded.

These handle pieces 39, when the scale components I and II are folded as shown in FIG. 20, assume a parallel relation to each other and render the weighing scale as a whole to represent a shape similar to a briefcase. It is to be noted that, in the embodiment shown in FIGS. 19 to 22, no fastener such as those indicated by 8 and 8a in FIGS. 1 and 2 may be employed because when the user holds the handle pieces 39 together, the scale components I and II can be kept in the folded position. However, if desired, the fasteners may be employed.

Other than the flexible connecting band such as used in the embodiments essentially shown in FIGS. 1 and 2 and FIGS. 19 to 22 and the tape-type fasteners such as used in the embodiment shown in FIG. 16, the hingedly connecting means for connecting the right-hand and left-hand scale components I and II together for movement between the unfolded and folded positions may take different forms, some of which will now be described.

In the embodiment shown in FIGS. 23 to 29, the hingedly connecting means comprises a generally rectangular hinge plate 40 having its opposite ends rigidly secured in any suitable manner, for example, by the use of set screws, a bonding agent or a plastics welding technique, exteriorly to the bases 4 and 5 of the scale components I and II, respectively. As best shown in FIG. 25, the hinge plate 40 has three lines of bending defined by respective V-cut grooves 40a, 40b and 40c extending parallel to one another in a direction widthwise thereof, the depthwise direction of the V-cut groove 40b being opposite to that of any one of the V-cut grooves 40a and 40c. While each of the V-cut grooves 40a and 40b is, when the hinge plate 40 has been fitted at its opposite ends to the scale components I and II, located adjacent one side edge of the base 4 or 5 of the respective scale component I or II, the V-cut groove 40b is located intermediate of the distance between the V-cut grooves 40a and 40c so that, when and so long as the scale components I and II are folded together as shown in FIGS. 28 and 29, respective portions of the hinge plate 40 can be sandwiched between the scale components I and II having been folded together.

For connecting the electric circuit components in one of the scale components I and II with those in the other of the scale components I and II, the helically curled cord 34 is employed as in the case with the embodiment shown in and described with reference to FIGS. 16 to 18. This curled cord 34 which will bend so as to represent a generally U-shaped configuration when and after the scale components I and II have been folded can be accommodated in part in a storage recess 41a, defined in the base 4 of the right-hand scale component I adjacent one end thereof, and in part in a storage recess 41 defined in the base 5 of the left-hand scale component II adjacent one end thereof as shown in FIG. 24.

With the hinge plate 40 fitted at its opposite ends to the respective scale components I and II, the V-cut grooves 40a and 40c open upwards and the V-cut groove 40b opens downwards, so that when the scale components I and II in the unfolded position shown in FIG. 26 are to be folded together, the portions of the hinge plate 40 on respective sides of the V-cut groove 40b can be folded inwardly between the scale components I and II as best shown in FIG. 27 by the effect of a gravitational force, and subsequently sandwiched between the scale components I and II as shown in FIGS. 28 and 29. The spiral cord 34 is then accommodated in part within the storage recess 41a and in part within the storage recess 41, and therefore, does not drop out of the weighing scale as a whole.

Although not shown in FIGS. 23 to 29, the weighing scale shown therein may have any suitable handle means of a construction similar to that used in any one of the foregoing embodiments. Also, it should be understood that, although not shown, the weighing scale according to the embodiment shown in FIGS. 23 to 29 is also equipped with the start switch. Furthermore, fasteners similar to the fasteners 8 and 8a shown in FIGS. 1 and 2 may be employed to keep the scale components I and II in the folded position.

In the embodiment shown in FIGS. 30 and 31, the hingedly connecting means comprises a generally rectangular casing 44 substantially equal in length to any one of the scale components I and II and also in width to the sum of the respective thicknesses of the scale components I and II, and a pair of flexible connecting bands 45 and 45b. The connecting band 45 has its opposite sides rigidly secured to the bottom of the casing 44 and the base 4 of the right-hand scale component I while the connecting band 45a has its opposite sides rigidly secured to the bottom of the casing 44 and the base 5 of the left-hand scale component II. Each of the connecting bands 45 and 45a is of a construction similar to the connecting band shown in and described with reference to FIG. 4 and, therefore, is to be understood as having a flexible printed wiring substrate embedded therein.

The casing 44 accommodates therein the arithmetic unit and the display unit including the display panel 9 disposed at one end portion thereof for the display of the measured weight.

The weighing scale 1 according to the embodiment shown in FIGS. 30 and 31 is so designed that, when and so long as the scale components I and I are unfolded, the casing 44 can be positioned intermediately between the scale components I and II, permitting the display panel 9 to be conveniently viewed by the user as shown in FIG. 30, but when they are folded together, the casing 44 can serve as a bottom support as shown in FIG. 31. More specifically, when the scale components I and II are folded together, one of the sides of the scale components I and II adjacent the casing 44 rest on top of the casing 44 with the respective platforms 2 and 3 held in abutment with each other.

Even in this embodiment of FIGS. 30 and 31, the weighing scale 1 may have one or both of the fasteners and the handle means fitted in a manner similar to that described in connection with the foregoing embodiments.

In the embodiment shown in FIGS. 32 and 33, the hingedly connecting means comprises a pair of stud shafts for each of the scale components I and II. More specifically, the casing 44 used in this embodiment has a length smaller than that of any one of the scale components I and II while each of the scale components I and II has one side portion inwardly recessed to accommodate a respective side portion of the casing 44. The paired stud shafts extend outwardly from the opposite end of the casing 44 and are pivotably received in the respective bases 4 and 5 so that the scale components I and II can pivot about the paired stud shafts.

The weighing scale according to the embodiment shown in FIGS. 32 and 33 has a start switch 54 so disposed on the bottom of the weighing scale, that is, in the base 4 of the right-hand scale component II that, when the scale components I and II have been unfolded and placed on the floor and when a predetermined load of, for example, 5 kg is subsequently applied thereto, the start switch 54 can be turned on. In practice, when the user stands on the weighing scale while the scale components I and II have been unfolded, the start switch 54 can be automatically turned on to cause the electric circuitry in the weighing scale to be powered.

Figure 34:
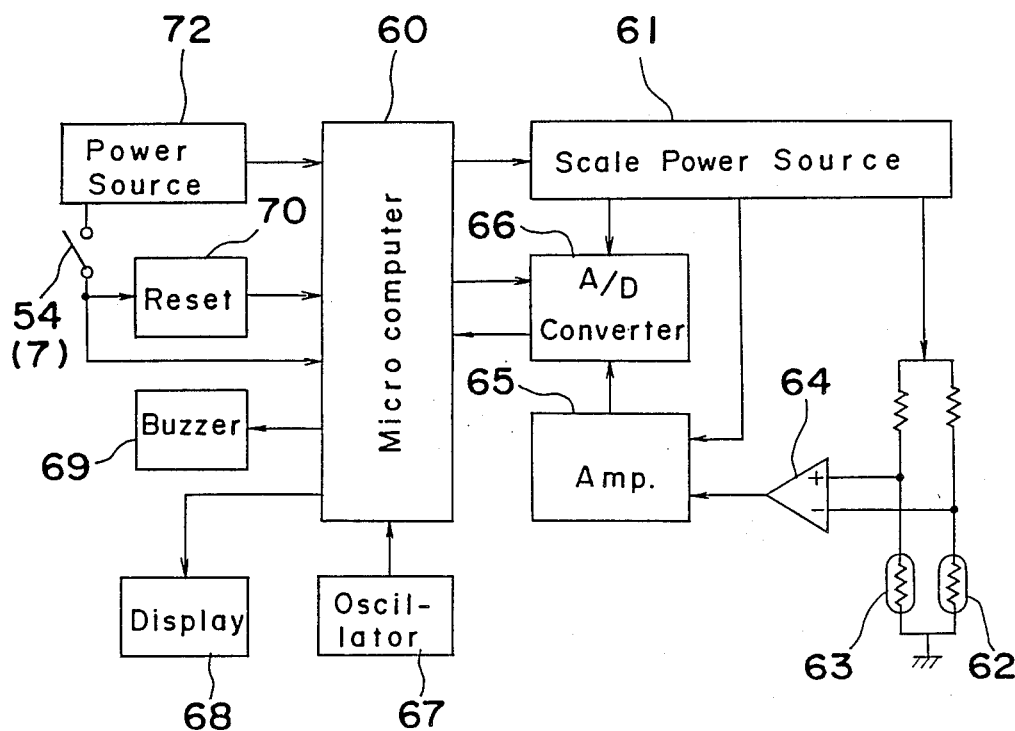
FIG. 34 is a circuit block diagram showing an electric circuit used in the weighing scale.

FIG. 34 illustrates the electric circuitry which may be used in the weighing scale according to any one of the foregoing embodiments.

Referring to FIG. 34, the electric circuitry includes a microcomputer 60 having a central processing unit and internal memories, such as read-only memories and random access memories, all built therein; strain gauges 62 and 63 secured to the strain inducing plates in the right-hand and left-hand scale components II and I, respectively; a differential amplifier 64 capable of generating an output signal indicative of the difference in value between outputs from the strain gauges 62 and 63; an amplifier unit 65 for amplifying the difference output from the differential amplifier 64; an analog-to-digital converter 66 for converting the amplified difference output into a digital signal which is applied to the microcomputer 60; an oscillator 67 for generating clock pulses utilized by the microcomputer 60; a display unit 68 including the display panel 9; a warning unit 69 which may be comprised of a buzzer for providing an audible warning indicative of the completion of the weight measurement; a reset unit 70 adapted to be operated by the weight responsive start switch 54; and a microcomputer power source 72 for powering the microcomputer 60.

All of the strain gauges 62 and 63, the differential amplifier 64, the amplifier unit 65, and the converter 66 are electrically powered by a scale power source 61.

The strain gauges 62 and 63 are so secured to the strain inducing plates in the left-hand and right-hand scale components II and I, respectively, that the strain gauges 62 and 63 can, when loaded, generate positive-going and negative-going voltages $\Delta V_L$ and $\Delta V_R$, respectively, with respect to the voltage equal to half the power source voltage. The difference $\Delta V_L - (-\Delta V_R)$ between the gauge output voltages $\Delta V_L$ and $\Delta V_R$ is calculated by the differential amplifier 65, the difference output signal from the amplifier 65 being in turn amplified by the amplifier unit 65 and then digitalized by the converter 66.

The weight responsive start switch 54 can be turned on when the user desiring to measure his weight stands on the weighing scale with the scale components unfolded, and the microcomputer 60 is reset in response to the closure of the start switch 54 in readiness for the actual weight measurement. The sequence of operation of the microcomputer 60 during the actual weight measurement will now be described with reference to the flowchart shown in FIG. 35.

The microcomputer 60 causes the scale power source to supply an electric power to the strain gauges 62 and 63 and to the other circuit components 64 to 66. Then, the difference signal from the amplifier 65 is converted into the digital signal by the converter 66, and the computer 60 subsequently compares the value represented by the digital signal with the previous value. If the difference therebetween falls within a predetermined range of $\Delta V_M$, it is regarded that the stability is gained, and the signal obtained from the A/D converter 66 is loaded as DATA1 in a RAM provided in the microcomputer 60 and, at the same time, the warning unit 69 is energized to generate an audible sound asking the user to leave the weighing scale. The departure of the user from the weighing scale is recognized by monitoring the weight responsive start switch 54, followed by the initiation of the zero-point measurement. The analog-to-digital conversion is repeated in the manner as hereinabove described until the difference between the previous value and the current value becomes equal to or smaller than the predetermined value of $\Delta V_0$, at which time the zero-point is regarded as established and is loaded as DATA2 in a RAM of the microcomputer 60. From DATA1 and DATA2, the weight W is calculated, i.e., W=K (DATA1−DATA2) (K: constant), which weight W is displayed for a predetermined length of time T, for example, 15 seconds. Thereafter, the supply of the electric power to the blocks necessary for the weight measurement is interrupted while the microcomputer 60 enters in a stand-by mode which is an energy-saving mode.

Figure 35:
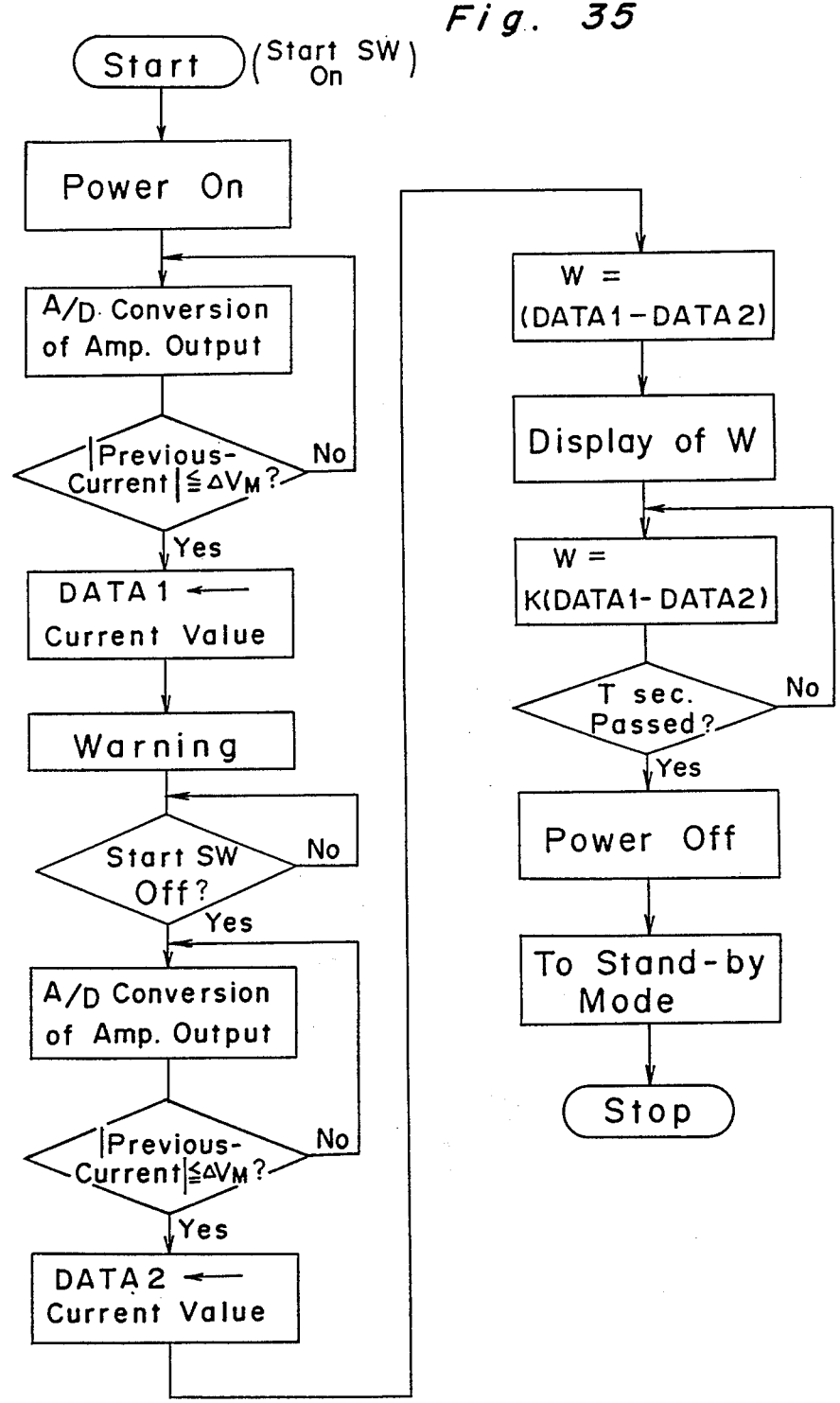
FIG. 35 is a flowchart showing the sequence of operation of a microcomputer shown in FIG. 34.
Figure 36:
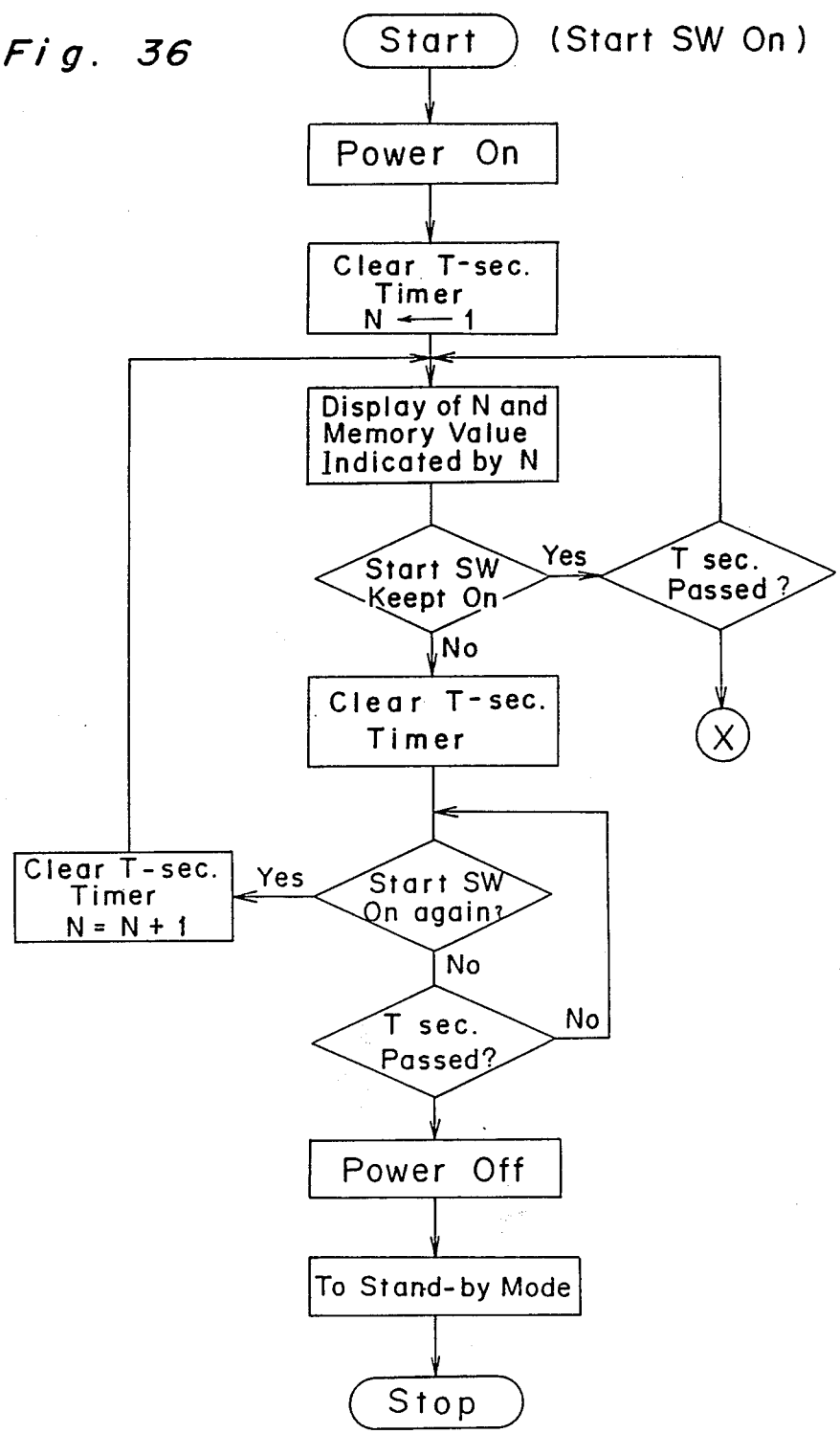
FIGS. 36 and 37 illustrate a modified flowchart of operation of the microcomputer.
Figure 37:
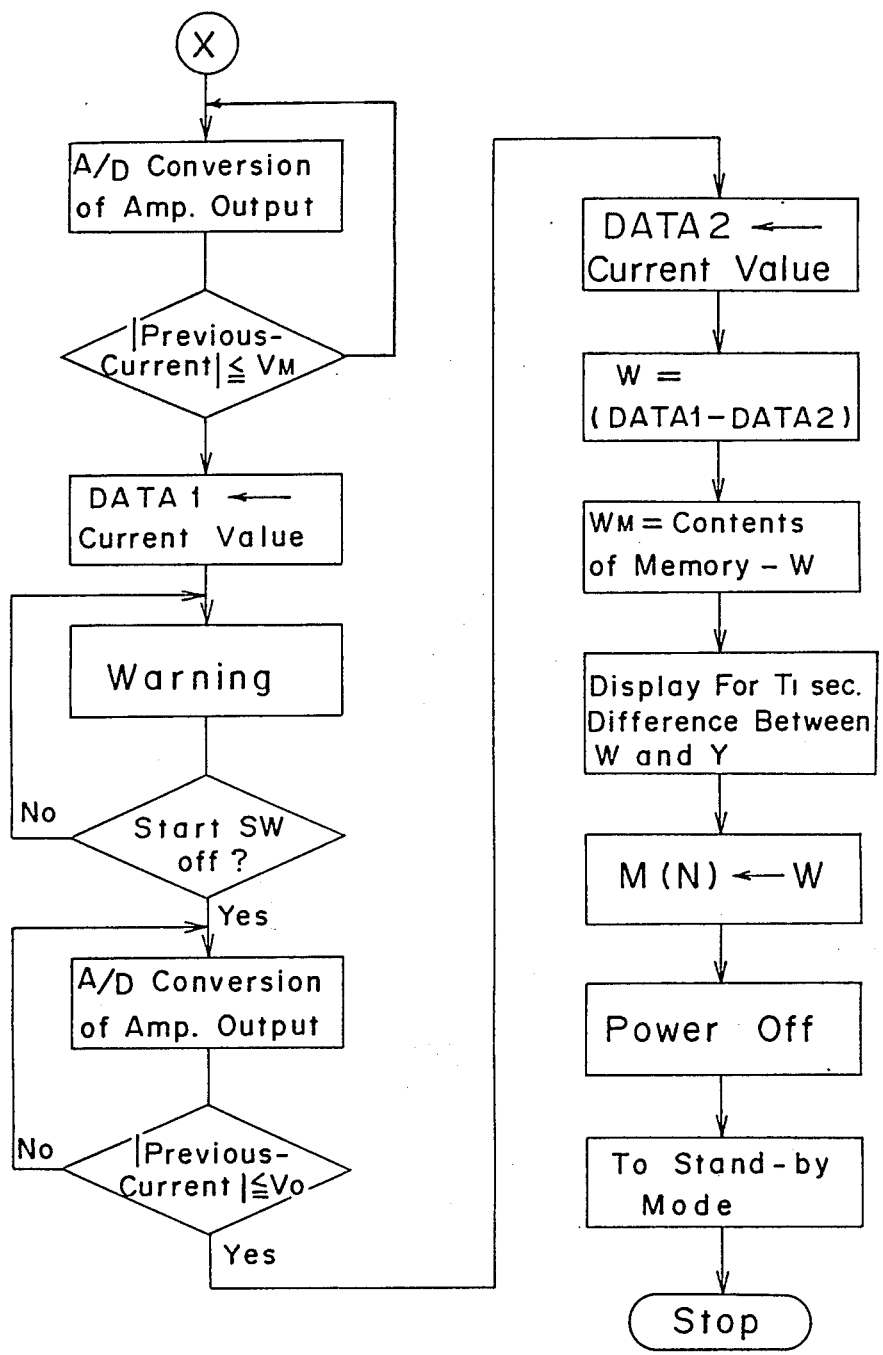

The program flow shown in and described with reference to FIG. 35 can be modified as shown in FIGS. 36 and 37.

Referring to FIGS. 36 and 37, when the weight responsive start switch 54 is turned on for the first time, the microcomputer 60 then in the stand-by mode is brought into a measuring mode ready for the actual weight measurement. At this time, N is rendered to be 1 as an initial value, and a timer monitors whether or not the start switch 54 is repeatedly turned on. Thereafter, a decision is made, while the contents of a memory indicated by the value N are displayed, to determine if the start switch 54 is again depressed. If the start switch 54 is kept turned on for a predetermined time T, for example, 5 seconds, the user is deemed to have gotten on the weighing scale with the actual weight measurement consequently started. In the case where the start switch 54 once turned off is again turned on, N is incremented by one, followed by the clearing of the timer, and a return is then made for both N and the contents of a memory N0 indicated by the incremented N to be displayed.

The weight measurement is carried out in the following manner. The output from the amplifier 65 is converted by the converter 66 into the digital signal which is subsequently compared with the previous value. If the difference therebetween falls within a predetermined range of $\Delta V_M$, it is regarded that the stability is gained, and the signal obtained from the A/D converter 66 is loaded as data DATA1 in RAM provided in the microcomputer 60 and, at the same time, the warning unit 69 is energized to generate an audible sound asking the user to leave the weighing scale. The departure of the user from the weighing scale is recognized by monitoring the weight responsive start switch 54, followed by the initiation of the zero-point measurement. The analog-to-digital conversion is repeated in the manner as hereinabove described until the difference between the previous value and the current value becomes equal to or smaller than the predetermined value of $\Delta V_0$, at which time the zero-point is regarded as established and is loaded as DATA2 in the RAM of the microcomputer 60. From DATA1 and DATA2, the weight W is calculated, i.e., W=K (DATA1−DATA2) (K: constant), which weight W is displayed for a predetermined length of time T, for example, 15 seconds. Thereafter, the supply of the electric power to the blocks necessary for the weight measurement is interrupted while the microcomputer 60 enters in a stand-by mode which is an energy-saving mode.

The program flow described with reference to and shown in FIGS. 36 and 36 is advantageous in that, since the contents of the memory can be switched by a simple manipulation, no memory switch is required, making it possible to make the weighing scale in a more compact size. The display panel 9 used in any one of the foregoing embodiments is of a type wherein all of the figures capable of being displayed to provide a visual indication of the measured weight are of the same size. However, in the embodiment shown in FIG. 38, one of the figures, for example, the figure in the units position is made to be larger than all other figures. For this purpose, the display panel 9 shown in FIG. 39 has a plurality of, for example, three digit display elements, the digit element 88 being capable of presenting one of figures in the units position, the digit element 89 being capable of presenting one of the figures in the tens position, and the digit element 90 being capable of presenting one of the figures representative of a fraction of the unit.

Figure 38:
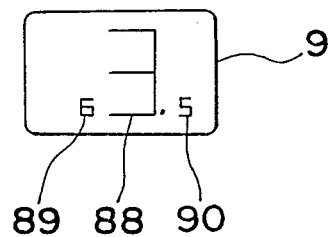
FIG. 38 is a schematic diagram showing a digital display panel according to a seventh embodiment of the present invention.

The display panel of the design shown in FIG. 38 is particularly advantageous where the day-by-day change of the weight is of great interest to the user. More specifically, a person being on a diet is often anxious to know of a change in his weight on, for example, a day-by-day basis, and, on the other hand, 10 kg or more gain of weight would not occur in a day. The use of a digit display element for displaying one of the figures in the units position which is greater in size than the remaining display elements enables the user on a diet to readily ascertain the daily change in weight, however, the size of each of such remaining display elements should not be too small to notice. Since it is usual that during the weight measurement, change in weight per day ranges from 500 g to 1 kg, the figure in the units position of XX.X kg in the case of the metric system or the figure in the units position of XXX pound in the case of the pound system is preferred to be displayed in a large size. In addition, it is preferred that the display element made large in size is comprised of a red light emitting diode whereas the other display elements are each comprised of a yellow or green light emitting diode.

In any event, the position of the larger digit display element can be selected depending upon the purpose for which the weighing scale is used.

Figure 39:
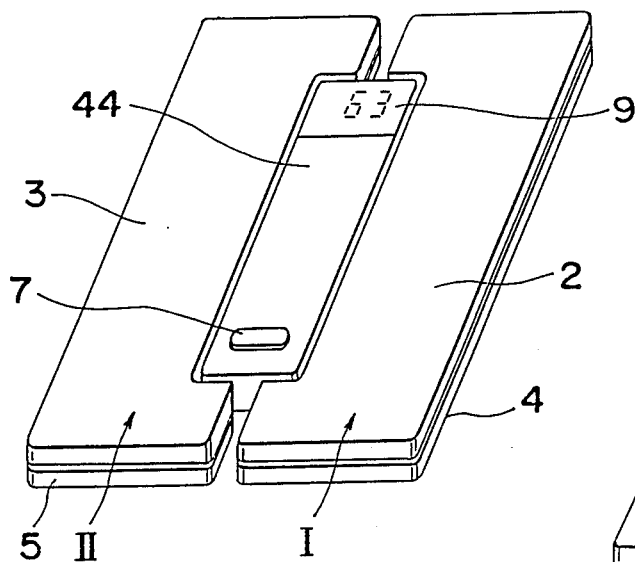
FIGS. 39 and 40 are views similar to FIGS. 1 and 2, respectively, showing an eighth embodiment of the present invention.
Figure 40:
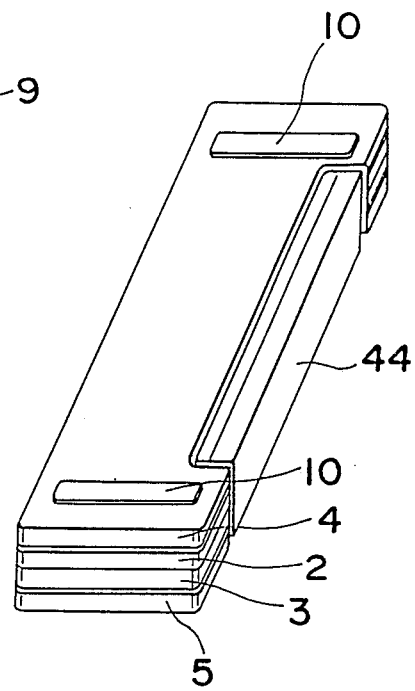
Figure 43:
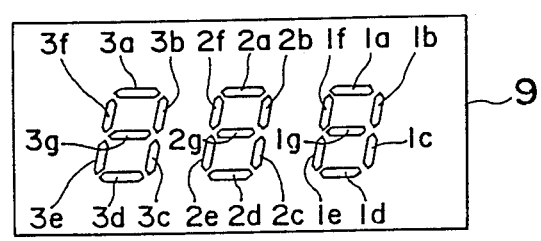
FIG. 43 is a plan view of the display panel using 3 seven-segment digit display elements.
Figure 44:
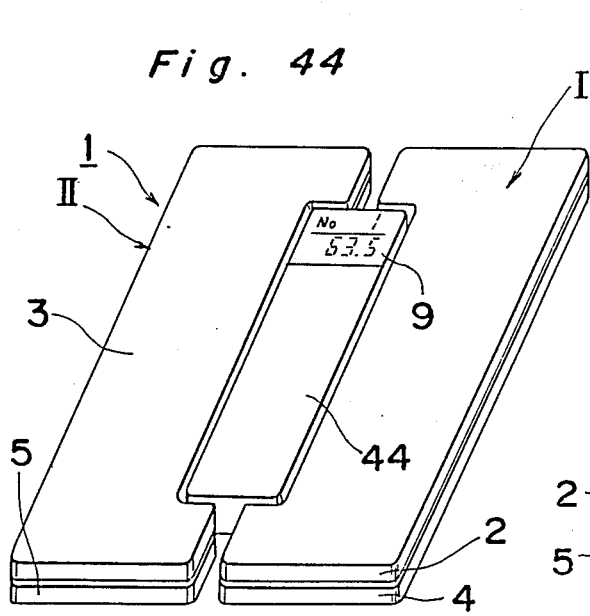
FIGS. 44 and 45 are views similar to FIGS. 1 and 2, showing a ninth embodiment of the present invention.
Figure 45:
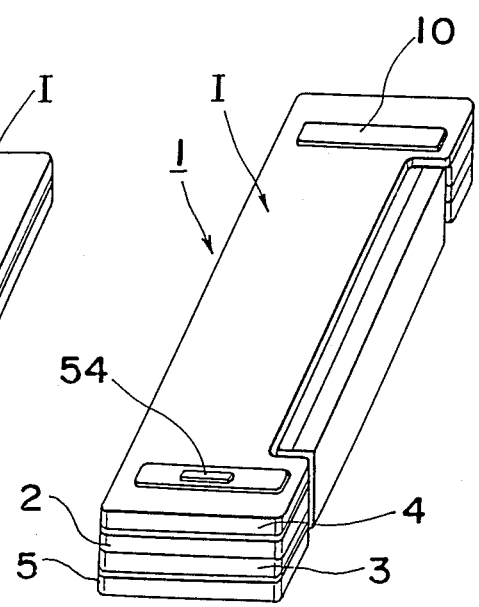
Figure 41:
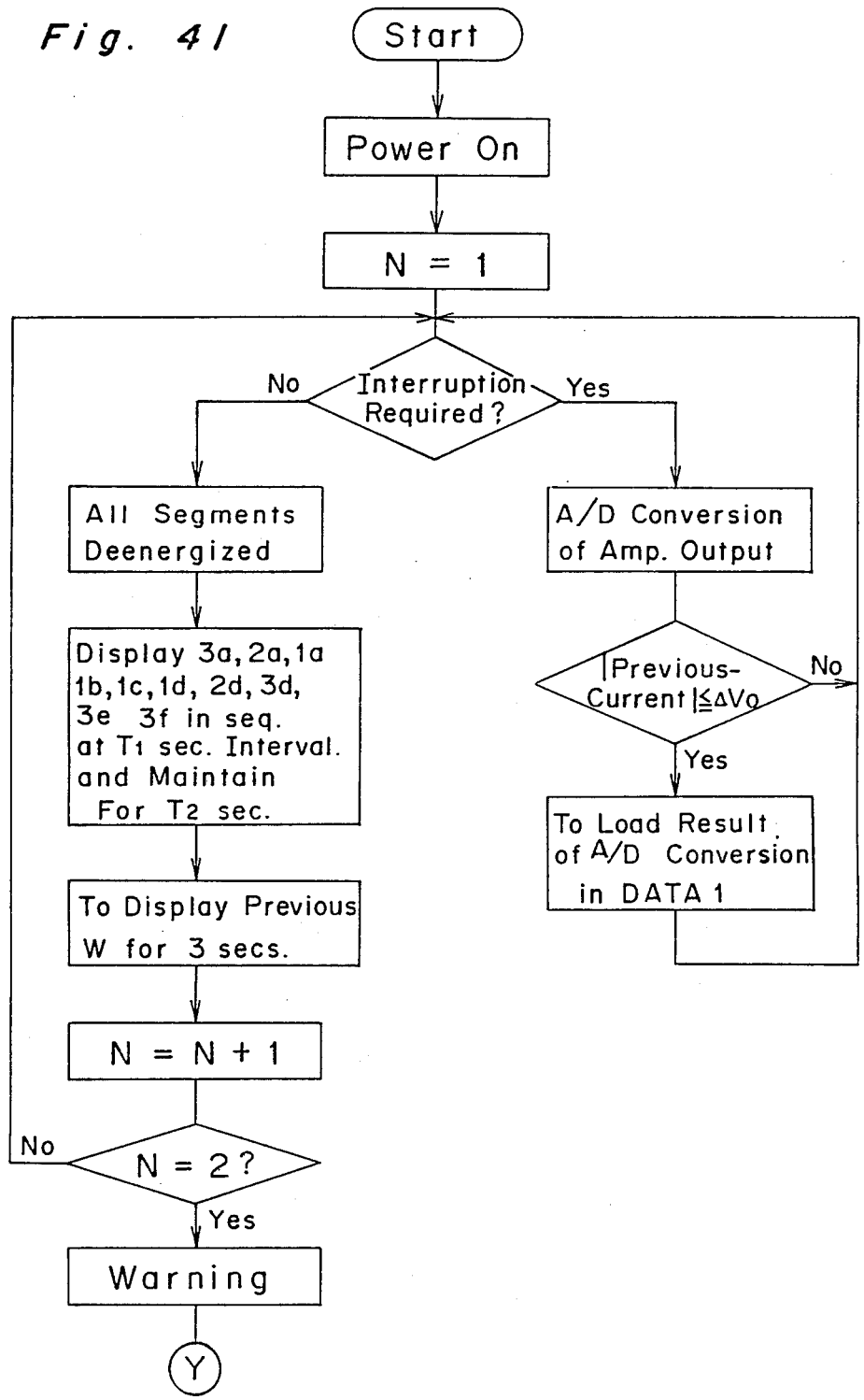
FIGS. 41 and 42 illustrate a flowchart showing the different sequence of operation of the microcomputer.
Figure 42:
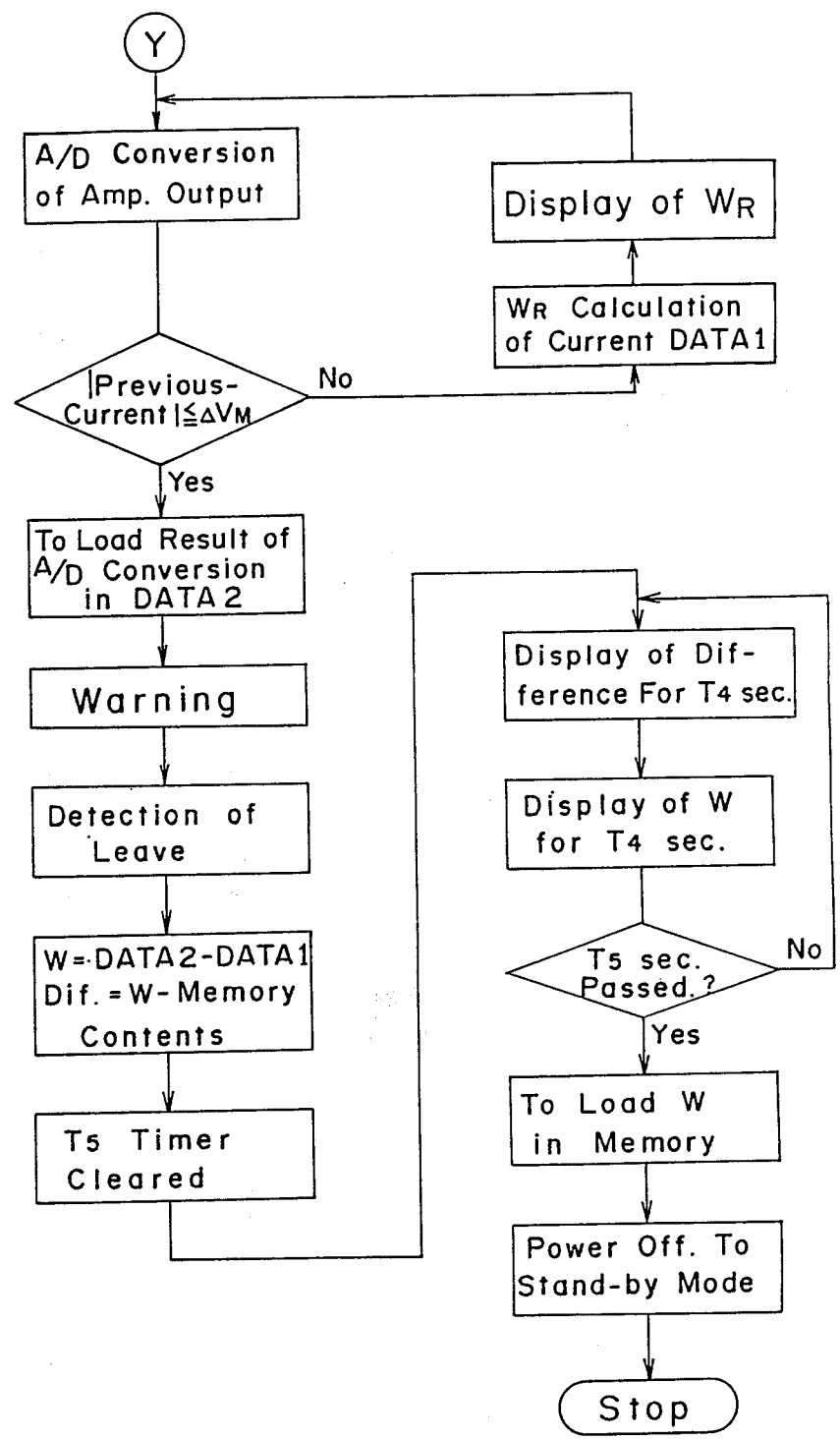

The weighing scale shown in FIGS. 39 and 40 is similar to that according to the embodiment shown in and described with reference to FIGS. 32 and 33, but differs in that the start switch 7 is disposed on the intermediate casing 44 so as to face upwards when the scale components I and II are unfolded.

Where the digit display elements used in the display panel 9 are each comprised of seven segments arranged in a configuration similar to the shape of a figure "8" as identified by 1a to 1g, 2a to 2g, or 3a to 3g in FIG. 43, the microcomputer 60 may be programmed so as to operate in a manner shown in FIGS. 41 and 42.

Referring now to FIGS. 41 and 42, assuming that the start switch is depressed, the scale power source is powered on, followed by the display of a warm-up condition. At the outset, all of the segments of each of the digit display elements are deenergized, but are sequentially energized to light one by one.

More specifically, the segments 3a, 2a, 1a, 1b, 1c, 1d, 2d, 3d, 3e and 3f are sequentially lit in the order specified above at intervals of a predetermined time T1, for example, 0.1 second, and after the lighting of the segment 3f, all of these segments are kept in energized condition for a predetermined time T2, for example, 0.3 second.

The energization of these segments 3a, 2a, 1a, 1b, 1c, 1d, 2d, 3d, 3e and 3f is indicative of the warm-up condition of the weighing scale. Thereafter, the previous weight of the user is displayed for a predetermined time T3, for example, 1 second. Assuming that the displays of the warm-up condition and of the previous weight constitute one cycle, this cycle is repeated for a length of time, for example, twice, required to complete the warm-up.

On the other hand, while the warm-up condition is being displayed, the microcomputer 60 executes the measurement of a zero point as a result of an interruption routine. The zero-point measurement is carried out in the following manner. Namely, the output from the amplifier 65 is converted by the converter 66 into the digital signal which is subsequently compared with the previous value. If the difference therebetween falls within a predetermined range of $\Delta V_M$, it is regarded that the stability is gained, and the signal obtained from the converter 66 is loaded as DATA1 in the RAM of the microcomputer 60.

After the completion of the zero-point measurement, the warning unit is energized to emit an audible sound inviting the user to stand on the weighing scale, followed by the actual weight measurement. During the actual weight measurement, the analog-to-digital conversion is repeated in a manner similar to that described above until the difference between the previous value and the current value becomes equal to or smaller than the predetermined value $\Delta V_0$, at which time the stability is deemed as established, and the result of the conversion is loaded as DATA2 in RAM of the microcomputer 60. It is needless to say that, each time the analog-to-digital conversion is carried out, the difference $W_R$ with DATA1 is calculated and displayed through the display unit 61.

Thereafter, the warning unit 69 is energized to emit an audible sound inviting the user to get off the weighing scale. After the detection of departure of the user from the weighing scale, the difference between the weight W calculated from DATA1 and DATA2 and the contents of the memory is calculated, and the comparison with the past weight is displayed for a predetermined time T5, for example, 15 seconds, at intervals of a predetermined time T4, for example, 1 second. The weight W currently being measured is loaded in the memory. Thereafter, the power supply to all of the blocks necessary for the measurement is interrupted and the microcomputer 60 is brought into the energy-saving stand-by mode.

The program according to the embodiment shown in and described with reference to FIGS. 41 and 42 is advantageous in that, not only can the single actuation of the start switch cause the weighing scale to assume the warm-up condition, but the warm-up condition can be displayed in a readily noticeable way. Moreover, during the warm-up condition, the previous weight measured during the previous weight measurement can be displayed.

Figure 46:
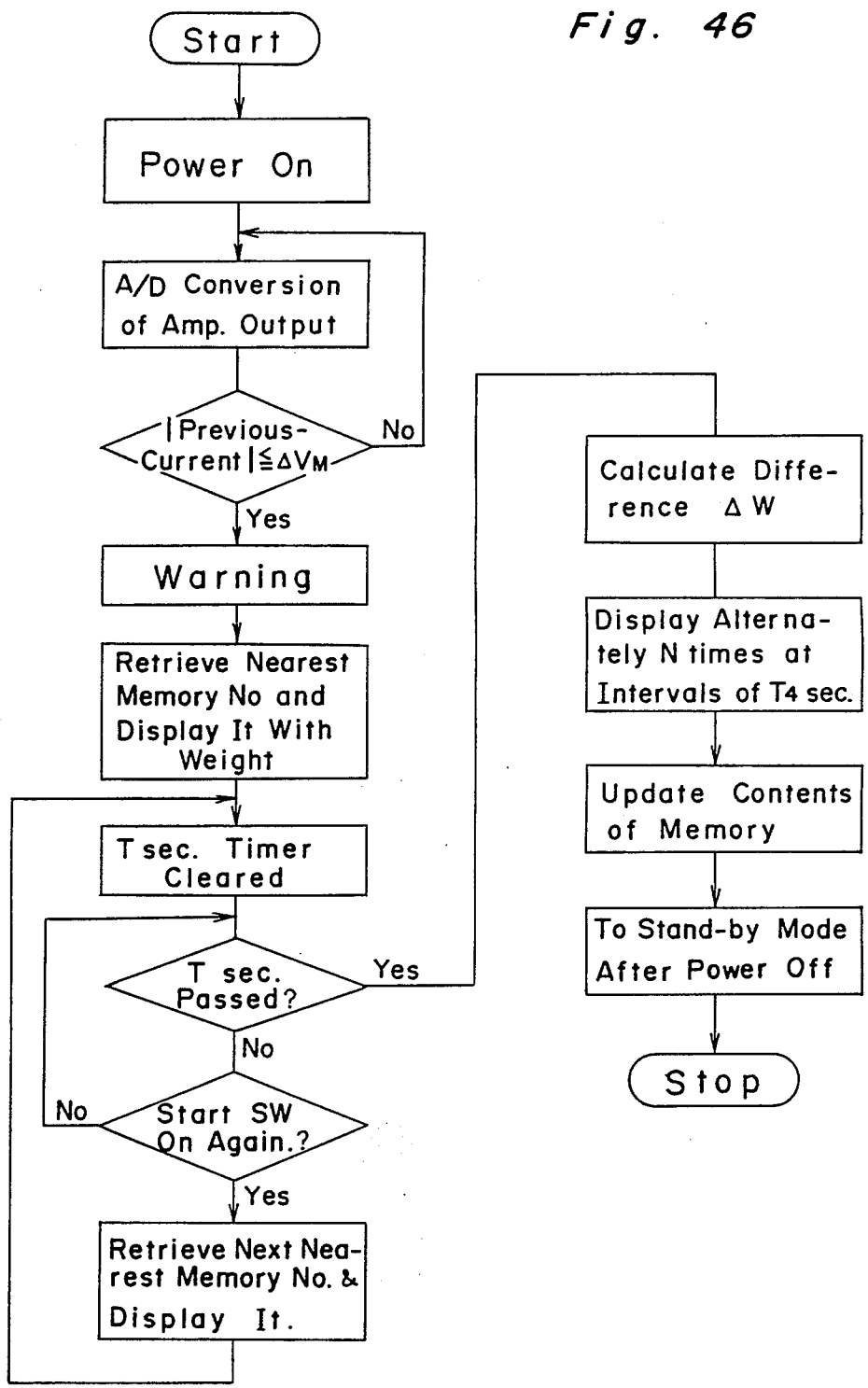
FIG. 46 is a flowchart showing the further modified sequence of operation of the microcomputer shown in FIG. 34.
Figure 47:
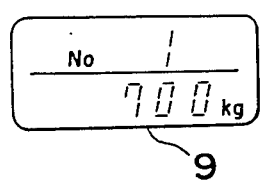
FIGS. 47 to 49 illustrate different display panels employable in the practice of the present invention.

The embodiment which will be described with particular reference to FIGS. 44 to 47 is so designed to store the weight of a plurality of persons in one of a corresponding number of memories and to enable one of the memories allocated to a particular person to be automatically selected. While the electric circuitry used in the weighing scale according to this embodiment is identical with that shown in FIG. 34, the microcomputer 60 is so designed as to operate as shown by a flowchart in FIG. 46 and the display panel 9 is additionally provided with a display region at which the number of any one of the memories can be displayed as best shown in FIG. 47.

Referring to FIG. 46, when a person stands on the weighing scale with his feet placed on the right-hand and left-hand scale components I and II, the weight responsive start switch 54 is turned on to bring the microcomputer 60 from the stand-by mode into the measuring mode ready for the actual weight measurement. The weight measurement is carried out in the following manner. The output from the amplifier 65 is converted by the converter 66 into the digital signal which is subsequently compared with the previous value. If the difference therebetween falls within the predetermined range of $\Delta V_M$, it is regarded that the stability is gained, and the signal obtained from the converter 66 is considered as representative of the weight W of such person while the warning unit is energized to emit an audible sound. This weight W is then compared with any one of contents stored in a plurality of memories, and is subsequently displayed together with the number of one of the memories whose contents are closer to the weight. By way of example, assuming that the weight W is measured as 70 kg, and the respective contents of the memories read as tabulated in the Table below, the contents of the memory number No. 1 is closest to the weight W and, therefore, "No. 1" is displayed as shown in FIG. 47.

TABLE

| Memory Nos. | Stored Contents |
|---|---|
| No. 1 | 73.0 |
| No. 2 | 60.0 |
| No. 3 | 15.0 |
| No. 4 | 0 |
| No. 5 | 0 |

Where the number of the memory displayed is incorrect, the switching of such incorrect memory number to the correct memory number is carried out in such a way that the person once standing on the weighing scale leaves it and then stands on the same weighing scale again. Unless this procedure is carried out within a predetermined time T, for example, 10 seconds, the microcomputer 60 determines that the memory member displayed is correct. Because of this, a timer providing the criterion of judgement is cleared.

Before the predetermined time T set in the timer elapses, the start switch 54 is monitored to check if the start switch 54 once turned off is again turned on. Once it has been confirmed that the start switch 54 has been again turned on, the number of the memory whose contents are in fact next closest to the weight, for example, "No. 2", is displayed, followed by the clearing of the timer.

If the predetermined time T set in the timer has passed, the memory number displayed is deemed correct, and the difference $\Delta W$ between the current weight and the previous weight stored in the memory of which number is then displayed is calculated. The difference $\Delta W$ and the weight W are alternately displayed for a predetermined number of times N, for example, five times, at intervals of a predetermined time, for example, 1 second. Thereafter, the current weight W is loaded in the RAM represented by the memory number being displayed, followed by the return of the computer 60 to the stand-by mode after switching the scale power source off.

According to the embodiment shown in and described with reference to FIGS. 44 to 47, the weighing scale can be advantageously used by members of the family because it is probable that the weight of one of the family members greatly differs from that of another member of the same family. Moreover, unlike the conventional scale of this kind, the weighing scale according to the embodiment of FIGS. 43 to 47 requires no memory selector switches allocated to the respective family members.

The display panel 9 may comprise, in addition to the digit display elements 138 each made of seven light emitting diode segments, a light emitting diode lamp 139 which, when lit, indicates that the figure below the decimal place is of a value equal to or greater than the number five. For example, if the weight actually measured reads 63.5 kg, the figures "63" are displayed by two of the display elements 138 and the figure "5" which ought to be displayed is superseded by the lighting of the diode lamp 139. On the other hand, if the weight reads 63.0 kg, only the figures "63" are displayed by the display elements 138 and no diode lamp 139 is energized.

In the display panel 9 shown in FIG. 52, in addition to the diode lamp 139, another similar LED lamp 139a is used. Preferably, the lamps 139 and 139a can emit light of different colors, for example, green and red, respectively. In this example, the lamp 139 is lit when a figure in the decimal place of the measured weight is smaller than the number five, whereas the lamp 139a is lit when it is equal to or greater than the number 5.

Figure 48:
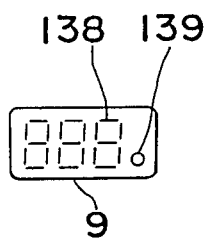
Figure 49:
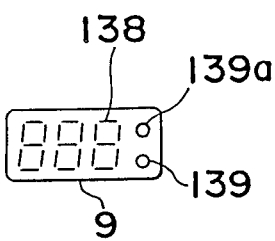

The weighing scale employing the display panel shown in any one of FIGS. 48 and 49 employs the electric circuitry shown in and described with reference to FIG. 4, the microcomputer of which is programmed to execute the flowchart of FIG. 35.

The lamp 139 may be used to indicate, when lit, that the weight measured has increased or decreased as compared with the weight which has been previously measured. Similarly, the lamps 139 and 139a can be used to indicate the increase and decrease of the weight, respectively, as compared with the previously measured weight.

It is to be noted that the display panel may be employed in the form of a liquid crystal display panel or fluorescent indicator lamps other than LED lamps.

Figure 50B:
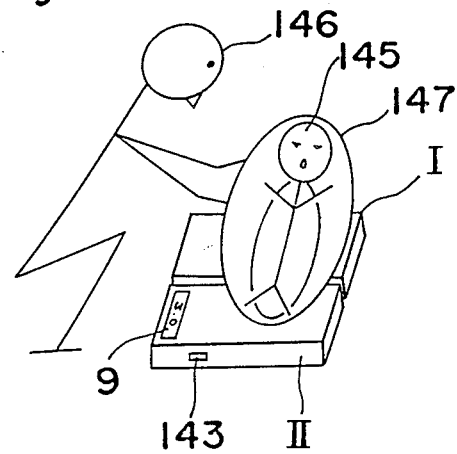

In any one of the foregoing embodiments, the figures displayed on the display panel 9 can be viewed as normal, erected images when an adult person 144 being weighed looks at the display panel 9 in one particular direction. This is illustrated in FIG. 50(a). However, when a baby 145 in a baby basket 147 is to be weighed and, for this purpose, the basket 147 is placed on the weighing scale while straddling the scale components I and II, and when the mother 146 occupying a position on one side of the display panel opposite to the platforms looks at the display panel in a manner substantially as shown in FIG. 10(b), it is obvious that the figures displayed on the display panel are viewed as reversed images. This inconvenience can be advantageously eliminated by the embodiment which will now be described with particular reference to FIGS. 51 to 54. In summary, according to the embodiment which will now be described, the figures to be displayed on the display panel can be reversed in position by the manipulation of a selector switch 143.

Figure 51:
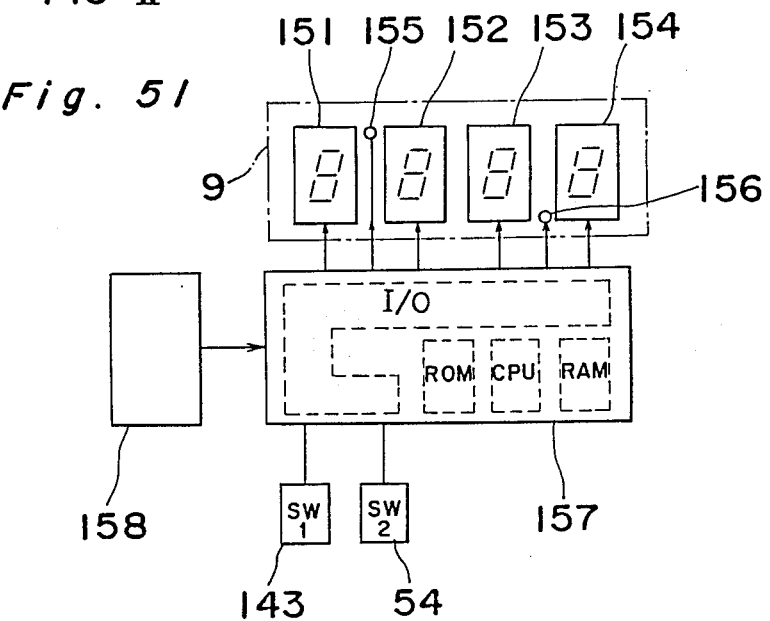
FIG. 51 is a schematic circuit block diagram showing the display system used in the embodiment of FIG. 50.

The weighing scale according to the embodiment shown in FIGS. 51 to 54 makes use of a control device, best shown in FIG. 51, which executes a program flow shown in FIG. 52. When an adult person stands on the weighing scale or a baby in a basket is placed on the weighing scale, the weight responsive start switch 54 is turned on to power the control device 157. The control device 157 is connected not only with the start switch 54, but also with a weight sensor unit 158, comprised of the strain gauges, and a selector switch 143 and, accordingly, as soon as the control device 157 is powered on, the control device 157 reads both the position of the selector switch 143 and a weight signal indicative of the weight detected by the weight sensor unit 158, which are subsequently loaded in RAM of the control device 157.

The control device 157 has a built-in input/output interface which is connected with LED segments a, b, c, d, e, f and g of each digit display element 151, 152, 153 and 154 and LED elements 155 and 156 representative of decimal points, all provided in the display panel 9. The weight data stored in RAM of the control device 157 are decoded for the display, depending on the position of the selector switch 143, and outputted to the display panel 9 so that the figures descriptive of the measured weight can be displayed having been oriented in one of the different directions depending on the position of the selector switch 143.

FIGS. 53 and 54 illustrate the relationship between the display decoder and the LED segments of each digit display element used in the display panel 9. FIG. 53(b) illustrates the display decoder used when the selector switch 143 is in one of the two positions, whereas FIG. 54(b) illustrates the display decoder used when the selector switch 143 is in one of the two positions, whereas FIG. 54(b) illustrates the display decoder used when the selector switch 143 is in the other of the positions. To display a figure of, for example, "9", the use of the display decoder shown in FIG. 53(b) results in the energization of only the LED segments a, b, c, f and g as shown in FIG. 53(a) whereas the use of the display decoder shown in FIG. 54(b) results in the energization of only the LED segments c, d, e, f and g as shown in FIG. 54(a). Similarly, in order to display a figure of "3", the LED segments a, b, c, d and g will be energized when the selector switch 143 is in said one of the positions, and the LED segments a, f, e, d, and g will be energized when the selector switch 143 is in said other of the positions. Thus, the selector switch 153 is to be manipulated depending on the direction in which the display panel 9 is viewed.

Although the present invention has been described in connection with the various embodiments thereof with reference to the accompanying drawings, it is to be noted that various changes and modifications are apparent to those skilled in the art. By way of example, although in the foregoing embodiments reference has been made to the use of the strain gauges, any weight sensor, for example, pressure sensors, or any other detectors capable of generating output signals indicative of the weight, or a portion thereof can be equally used in the practice of the present invention.

Accordingly, such changes and modifications are to be understood as included within the scope of the present invention as defined by the appended claims, unless they depart thereform.

We claim:

1. A foldable, strain gauge type weighing scale comprising:
   a pair of scale components generally identical in construction and shape, the pair of scale components being hingedly connected together for movement between folded and unfolded positions;
   hingedly connecting means for connecting the scale components for movement between the folded and unfolded positions;

means for electrically connecting the pair of scale components; and a display unit;

each of said scale components including a base, a platform disposed above the base for relative movement both towards and away from the base, a strain inducing plate accommodated in a space delimited by the base and the platform, and supported at its opposite ends for deformation in a direction perpendicular to the strain inducing plate when a load is exteriorly applied thereto through the platform, and at least one strain gauge mounted on the strain inducing plate;

said display unit being electrically connected with the strain gauges in the respective scale components for converting respective output signals from these strain gauges into a weight signal and for displaying information represented by the weight signal, and said means for electrically connecting being for connecting the strain gauges.

2. The scale as claimed in claim 1, further comprising releasable fastening means for keeping the scale components in the folded position.

3. The scale as claimed in claim 1, further comprising handle means for the ease of transportation.

4. The scale as claimed in claim 1, wherein the electrically connecting means comprises a spirally curled cord.

5. A foldable weighing scale for measuring the weight of an object to be weighed, which comprises:

means for outputting a signal indicative of the weight to the outside;

first weight detecting means for detecting the weight or a portion thereof and for generating a first weight signal;

second weight detecting means for detecting the weight or a portion thereof and for generating a second weight signal;

means for electrically connecting the first and second weight detecting means so that said first and second weight detecting means can be operated in unison with each other or independently from each other;

converter means connected with the electrically connecting means for converting the first weight signal and/or the second signal into a signal indicative of the total weight so that the signal indicative of the total weight can be outputted to the outputting means;

first retaining means for holding the first weight detecting means;

second retaining means for holding the second weight detecting means; and connecting means for connecting the first and second retaining means for movement between a first position, in which the first and second weight detecting means can be used simultaneously, and a second position in which both cannot be used simultaneously.

6. The scale as claimed in claim 5, further comprising arithmetic means for performing a calculation with respect to two values obtained when a person stands on the scale and when the person is clear from the scale, said calculation being performed after the person has left the scale.

7. The scale as claimed in claim 5, further comprising a plurality of memories for storing respective weights of different persons, and means for changing the contents of the memories when a particular person repeatedly gets on the scale.

8. The scale as claimed in claim 5, further comprising memory means for storing the weight measured, said scale having an automatic zero-point adjusting capability, and wherein the display unit includes means for effecting a display of the weight previously measured and a display which will attract the attention of a person during a period of time corresponding to the time required for an electric circuitry to be stabilized and the time required for the zero-point adjustment be completed.

9. The scale as claimed in claim 5, further comprising a plurality of memories for storing respective weights of different persons, and means for determining, on the basis of the weight of a particular person standing on the scale, one of the memories to be used for such particular person.

10. The scale as claimed in claim 5, wherein the outputting means is a display unit.

11. The scale as claimed in claim 10, wherein the display unit includes a display panel capable of displaying figures descriptive of the weight measured, one of said figures being greater in size than the remaining figures.

12. The scale as claimed in claim 10, wherein the display unit has a non-numeric display region for displaying an indicia descriptive of a figure below the decimal point of the weight data.

13. The scale as claimed in claim 10, wherein the direction of figures displayed by the display unit is variable.

14. The scale as claimed in claim 13, wherein the direction can be selected by a selector switch disposed in the scale.

15. The scale as claimed in claim 13, wherein the display unit is a digital display unit.

16. The scale as claimed in claim 15, wherein the display unit comprises a plurality of digit display elements each made up of seven light emitting diode segments arranged in a configuration similar to the shape of a figure "8".

* * * * *